US012680877B2

(12) United States Patent
Rubin et al.

(10) Patent No.: US 12,680,877 B2
(45) Date of Patent: Jul. 14, 2026

(54) SYSTEMS AND METHODS OF IMAGING POLARIMETRY THROUGH METASURFACE POLARIZATION GRATINGS

(71) Applicant: PRESIDENT AND FELLOWS OF HARVARD COLLEGE, Cambridge, MA (US)

(72) Inventors: Noah A. Rubin, Cambridge, MA (US); Paul Chevalier, Cambridge, MA (US); Federico Capasso, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 192 days.

(21) Appl. No.: 18/291,204

(22) PCT Filed: Jul. 22, 2022

(86) PCT No.: PCT/US2022/038059
§ 371 (c)(1),
(2) Date: Jan. 22, 2024

(87) PCT Pub. No.: WO2023/004143
PCT Pub. Date: Jan. 26, 2023

(65) Prior Publication Data
US 2024/0210246 A1 Jun. 27, 2024

Related U.S. Application Data

(60) Provisional application No. 63/225,162, filed on Jul. 23, 2021.

(51) Int. Cl.
*G01J 4/04* (2006.01)
*G02B 1/00* (2006.01)
(Continued)

(52) U.S. Cl.
CPC ................ *G01J 4/04* (2013.01); *G02B 1/002* (2013.01); *G02B 5/1842* (2013.01); *G02B 26/0808* (2013.01)

(58) Field of Classification Search
CPC .... G01J 4/04; G01J 4/00; G01J 3/0224; G01J 3/447; G01J 3/2823; G01J 3/0205;
(Continued)

(56) References Cited

U.S. PATENT DOCUMENTS 6,097,856 A 8/2000 Hammond
6,643,065 B1 * 11/2003 Silberman ............ G02B 5/1828
359/569

(Continued)

FOREIGN PATENT DOCUMENTS

CN 100476504 C 4/2009
CN 101510013 B 6/2010
(Continued)

OTHER PUBLICATIONS

International Search Report and Written Opinion for International Patent Appl. No. PCT/US2022/38059, issued Oct. 27, 2022 (19 pages).

*Primary Examiner* — Michael P Stafira
(74) *Attorney, Agent, or Firm* — FOLEY & LARDNER LLP

(57) ABSTRACT

An attachment for an intensity-only sensor in an imaging device includes a polarization-sensitive diffraction grating. The polarization-sensitive diffraction grating is configured to receive incident light from a scene, and to modify the incident light to simultaneously produce a plurality of non-overlapping images of the scene. each of a different diffraction order, on the intensity-only sensor to facilitate full-Stokes imaging polarimetry. The attachment includes a first adjustment mechanism configured to control at least one of: vignetting of the plurality of non-overlapping images on the
(Continued)

intensity-only sensor, or an object distance of the imaging device.

7 Claims, 25 Drawing Sheets

(51) Int. Cl.
 *G02B 5/18* (2006.01)
 *G02B 26/08* (2006.01)
(58) Field of Classification Search
 CPC .... G01J 3/0208; G01J 2003/2826; G01J 4/02;
 G01J 3/2803; G01J 3/18; G01J 3/44;
 G01J 3/027; G01J 3/02; G01J 3/4412;
 G01J 2003/2806; G01J 3/0229; G01J
 3/0256; G01J 1/0429; G01J 1/0407; G01J
 3/14; G01J 2009/0261; G01J 3/28; G01J
 1/0425; G01J 9/02; G01J 1/0209; G01J
 1/42; G01J 2009/023; G01J 3/0218; G01J
 3/0235; G01J 3/0237; G01J 3/26; G01J
 3/4532; G01J 3/0264; G01J 3/36; G01J
 5/59; G01J 2003/1291; G01J 3/0259;
 G01J 3/12; G01J 3/1256; G01J 3/45;
 G01J 1/0437; G01J 2003/282; G01J
 2005/0077; G01J 3/0297; G01J 3/10;
 G01J 3/51; G01J 5/10; G01J 1/4228;
 G01J 3/0286; G01J 3/42; G01J 3/513;
 G01J 5/0802; G01J 5/0806; G01J 5/0821;
 G01J 5/0881; G01J 1/0411; G01J 1/06;
 G01J 1/4257; G01J 2001/4242; G01J
 3/0291; G01J 9/00; G01J 11/00; G01J
 2003/283; G01J 2003/452; G01J
 2009/004; G01J 3/021; G01J 3/1804;
 G01J 3/4531; G01J 3/502; G01J 5/0837;
 G01J 5/0853; G01J 5/12; G01J 5/60;
 G01J 1/16; G01J 1/161; G01J 2003/1208;
 G01J 2003/1217; G01J 2005/123; G01J
 2009/0203; G01J 2009/0219; G01J
 2009/0234; G01J 2009/0265; G01J
 2009/0269; G01J 2009/0284; G01J
 2009/0288; G01J 3/0202; G01J 3/0248;
 G01J 3/0272; G01J 3/108; G01J 3/189;
 G01J 3/2889; G01J 3/30; G01J 3/4406;
 G01J 5/0818; G01J 5/48; G01J 5/485;
 G01J 9/0215; G02B 1/002; G02B 27/286;
 G02B 5/3058; G02B 5/3083; G02B
 27/283; G02B 5/3025; G02B 5/30; G02B
 27/28; G02B 21/0092; G02B 27/288;
 G02B 5/1809; G02B 27/0012; G02B
 5/201; G02B 5/3016; G02B 2207/101;
 G02B 5/008; G02B 27/285; G02B
 27/4261; G02B 5/1833; G02B 1/08;
 G02B 21/365; G02B 27/30; G02B 27/42;
 G02B 26/06; G02B 5/18; G02B 21/367;
 G02B 3/0006; G02B 3/0037; G02B
 5/1814; G02B 5/208; G02B 1/02; G02B
 21/18; G02B 27/4205; G02B 5/3041;
 G02B 5/32; G02B 21/361; G02B 5/1866;
 G02B 5/20; G02B 5/3008; G02B 6/08;
 G02B 6/105; G02B 1/10; G02B 13/16;
 G02B 21/14; G02B 26/0808; G02B
 27/00; G02B 27/1006; G02B 3/005;
 G02B 5/1861; G02B 5/3033; G02B 6/32;
 G02B 1/04; G02B 21/0016; G02B
 21/0068; G02B 21/06; G02B 21/16;
 G02B 27/0944; G02B 27/10; G02B
 27/106; G02B 27/126; G02B 27/141;
 G02B 27/149; G02B 27/281; G02B
 27/4244; G02B 3/0043; G02B 3/0056;
 G02B 30/25; G02B 5/1842; G02B
 5/3075; G02B 5/3091; G02B 6/126;
 G02B 6/4203; G02B 1/113; G02B 1/115;
 G02B 1/118; G02B 13/0045; G02B
 13/006; G02B 13/04; G02B 13/06; G02B
 13/22; G02B 17/061; G02B 19/008;
 G02B 21/0012; G02B 21/0032; G02B
 21/0036; G02B 21/006; G02B 2207/129;
 G02B 23/02; G02B 23/04; G02B 26/00;
 G02B 26/02; G02B 27/0025; G02B
 27/0916; G02B 27/0927; G02B 27/0988;
 G02B 27/4233; G02B 27/4294; G02B
 27/48; G02B 3/0031; G02B 5/0236;
 G02B 5/1871; G02B 5/203; G02B 5/204;
 G02B 5/286; G02B 5/288; G02B 6/06;
 G02B 6/1226; G02B 6/2746; G02B
 6/29335; G02B 6/29341; G02B 6/29343;
 G02B 6/4213; G02B 7/00; G02B
 17/0647; G02B 17/0694; G02B
 2006/02166; G02B 2006/12107; G02B
 2006/12116; G02B 2027/0109; G02B
 2027/0174; G02B 2027/0178; G02B
 21/0056; G02B 21/22; G02B 23/06;
 G02B 27/0037; G02B 27/0056; G02B
 27/0081; G02B 27/01; G02B 27/0172;
 G02B 27/09; G02B 27/0922; G02B
 27/0938; G02B 27/0955; G02B 27/0977;
 G02B 27/1013; G02B 27/1066; G02B
 27/12; G02B 27/123; G02B 27/646;
 G02B 3/00; G02B 3/10; G02B 5/0247;
 G02B 5/0263; G02B 5/0278; G02B 5/04;
 G02B 5/26; G02B 5/305; G02B 5/3066;
 G02B 6/02057; G02B 6/124; G02B 6/24;
 G02B 6/262; G02B 6/42; G02B 6/4201;
 G02B 6/4274; G02B 6/428
 See application file for complete search history.

(56) References Cited

U.S. PATENT DOCUMENTS

| | | | |
|---|---|---|---|
| 6,731,839 | B2 | 5/2004 | Bhagavatula et al. |
| 6,825,986 | B2 | 11/2004 | Ashkinazy et al. |
| 6,924,457 | B2 | 8/2005 | Koyama et al. |
| 6,927,922 | B2 | 8/2005 | George et al. |
| 7,061,693 | B2 | 6/2006 | Zalevsky |
| 7,171,078 | B2 | 1/2007 | Sasaki et al. |
| 7,171,084 | B2 | 1/2007 | Izumi et al. |
| 7,186,969 | B2 | 3/2007 | Shimomura et al. |
| 7,241,988 | B2 | 7/2007 | Gruber et al. |
| 7,324,210 | B2 | 1/2008 | De Groot et al. |
| 7,327,468 | B2 | 2/2008 | Maznev et al. |
| 7,402,131 | B2 | 7/2008 | Mueth et al. |
| 7,450,618 | B2 | 11/2008 | Dantus et al. |
| 7,547,874 | B2 | 6/2009 | Liang |
| 7,561,264 | B2 | 7/2009 | Treado et al. |
| 7,576,899 | B2 | 8/2009 | Kanesaka et al. |
| 7,679,830 | B2 | 3/2010 | Dowski |
| 7,684,097 | B2 | 3/2010 | Fukumoto et al. |
| 7,773,307 | B2 | 8/2010 | Shih |
| 7,800,683 | B2 | 9/2010 | Zalevsky et al. |
| 7,812,295 | B2 | 10/2010 | Zalevsky et al. |
| 7,929,220 | B2 | 4/2011 | Sayag |
| 7,965,607 | B2 | 6/2011 | Fukumoto et al. |
| 8,009,358 | B2 | 8/2011 | Zalevsky et al. |
| 8,040,604 | B2 | 10/2011 | Zalevsky et al. |

(56)                References Cited

U.S. PATENT DOCUMENTS

| | | | |
|---|---|---|---|
| 8,107,705 B2 | 1/2012 | Dowski et al. |
| 8,152,307 B2 | 4/2012 | Duelli et al. |
| 8,169,703 B1 | 5/2012 | Mossberg et al. |
| 8,192,022 B2 | 6/2012 | Zalevsky |
| 8,212,866 B2 | 7/2012 | Lemmer et al. |
| 8,318,386 B2 | 11/2012 | Kobrin |
| 8,351,048 B2 | 1/2013 | Millerd |
| 8,351,120 B2 | 1/2013 | Deng et al. |
| 8,390,932 B2 | 3/2013 | Jia et al. |
| 8,430,513 B2 | 4/2013 | Chang et al. |
| 8,451,368 B2 | 5/2013 | Sung et al. |
| 8,472,797 B2 | 6/2013 | Ok et al. |
| 8,558,873 B2 | 10/2013 | Mceldowney |
| 8,649,631 B2 | 2/2014 | Islam et al. |
| 8,687,040 B2 | 4/2014 | Silveira |
| 8,734,033 B2 | 5/2014 | Walters et al. |
| 8,816,460 B2 | 8/2014 | Kalevo et al. |
| 8,876,289 B2 | 11/2014 | Dorronsoro Diaz et al. |
| 8,908,149 B2 | 12/2014 | Freimann |
| 9,007,451 B2 | 4/2015 | Rogers et al. |
| 9,212,899 B2 | 12/2015 | Johnson et al. |
| 9,309,274 B2 | 4/2016 | Van Der Boom et al. |
| 9,310,535 B1 | 4/2016 | Greiner et al. |
| 9,329,484 B1 | 5/2016 | Markle et al. |
| 9,330,704 B2 | 5/2016 | Nishimura et al. |
| 9,367,036 B2 | 6/2016 | Pyun et al. |
| 9,369,621 B2 | 6/2016 | Malone et al. |
| 9,392,153 B2 | 7/2016 | Myhre et al. |
| 9,606,415 B2 | 3/2017 | Zheludev et al. |
| 9,609,190 B2 | 3/2017 | Lee et al. |
| 9,766,463 B2 | 9/2017 | Border et al. |
| 9,778,404 B2 | 10/2017 | Divliansky et al. |
| 9,825,074 B2 | 11/2017 | Tian et al. |
| 9,829,700 B2 | 11/2017 | Parent et al. |
| 9,835,870 B2 | 12/2017 | Astratov et al. |
| 9,836,122 B2 | 12/2017 | Border |
| 9,869,580 B2 | 1/2018 | Grossinger et al. |
| 9,880,377 B1 | 1/2018 | Safrani et al. |
| 9,885,859 B2 | 2/2018 | Harris |
| 9,891,393 B2 | 2/2018 | Reece |
| 9,947,118 B2 | 4/2018 | Khare et al. |
| 9,958,251 B1 | 5/2018 | Brock et al. |
| 9,967,541 B2 | 5/2018 | Piestun |
| 9,978,801 B2 | 5/2018 | Park et al. |
| 9,989,680 B2 | 6/2018 | Arbabi et al. |
| 9,995,859 B2 | 6/2018 | Kamali et al. |
| 10,007,118 B2 | 6/2018 | Border |
| 10,054,859 B2 | 8/2018 | Ye et al. |
| 10,108,085 B2 | 10/2018 | Peters et al. |
| 10,126,466 B2 | 11/2018 | Lin et al. |
| 10,149,612 B2 | 12/2018 | Muyo et al. |
| 10,254,454 B2 | 4/2019 | Klug et al. |
| 10,267,957 B2 | 4/2019 | Kamali et al. |
| 10,288,481 B2 * | 5/2019 | Day ........................ G01J 3/021 |
| 10,310,148 B2 | 6/2019 | Stewart et al. |
| 10,310,387 B2 | 6/2019 | Palmer et al. |
| 10,317,667 B2 | 6/2019 | Waller et al. |
| 10,324,314 B2 | 6/2019 | Czaplewski et al. |
| 10,338,275 B1 | 7/2019 | Acosta et al. |
| 10,341,640 B2 | 7/2019 | Shechtman et al. |
| 10,345,246 B2 | 7/2019 | Tian et al. |
| 10,345,519 B1 | 7/2019 | Miller et al. |
| 10,365,416 B2 | 7/2019 | Zhan et al. |
| 10,371,936 B2 | 8/2019 | Didomenico |
| 10,386,620 B2 | 8/2019 | Astratov et al. |
| 10,402,993 B2 | 9/2019 | Han et al. |
| 10,416,565 B2 | 9/2019 | Ahmed et al. |
| 10,440,244 B2 | 10/2019 | Rosenblatt et al. |
| 10,440,300 B2 | 10/2019 | Rephaeli et al. |
| 10,466,394 B2 | 11/2019 | Lin et al. |
| 10,468,447 B2 | 11/2019 | Akselrod et al. |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Iazikov et al. |
| 10,545,323 B2 | 1/2020 | Schwab et al. |
| 11,385,516 B2 | 7/2022 | Didomenico |
| 2002/0048727 A1 | 4/2002 | Zhou et al. |
| 2003/0107787 A1 | 6/2003 | Bablumyan |
| 2005/0239003 A1 | 10/2005 | Chiodini et al. |
| 2006/0042322 A1 | 3/2006 | Mendoza et al. |
| 2012/0140235 A1 | 6/2012 | Lee et al. |
| 2012/0258407 A1 | 10/2012 | Sirat |
| 2015/0055745 A1 | 2/2015 | Holzner et al. |
| 2016/0077261 A1 | 3/2016 | Arbabi et al. |
| 2016/0195705 A1 | 7/2016 | Betzig et al. |
| 2016/0331457 A1 | 11/2016 | Varghese et al. |
| 2016/0341859 A1 | 11/2016 | Shvets et al. |
| 2016/0361002 A1 | 12/2016 | Palikaras et al. |
| 2017/0038574 A1 | 2/2017 | Zhuang et al. |
| 2017/0125911 A1 | 5/2017 | Alu et al. |
| 2017/0131460 A1 | 5/2017 | Lin et al. |
| 2017/0250577 A1 | 8/2017 | Ho et al. |
| 2017/0299784 A1 | 10/2017 | Mikkelsen et al. |
| 2017/0329201 A1 | 11/2017 | Arnold |
| 2018/0035101 A1 | 2/2018 | Osterhout |
| 2018/0044234 A1 | 2/2018 | Hokansson et al. |
| 2018/0107015 A1 | 4/2018 | Dümpelmann et al. |
| 2018/0217395 A1 | 8/2018 | Lin et al. |
| 2018/0231700 A1 | 8/2018 | Ahmed et al. |
| 2018/0236596 A1 | 8/2018 | Ihlemann et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0314130 A1 | 11/2018 | Joo et al. |
| 2019/0025463 A1 | 1/2019 | She et al. |
| 2019/0041642 A1 | 2/2019 | Haddick et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1 | 2/2019 | Riley et al. |
| 2019/0086579 A1 | 3/2019 | Kim et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137793 A1 | 5/2019 | Luo et al. |
| 2019/0154877 A1 | 5/2019 | Capasso et al. |
| 2019/0170655 A1 | 6/2019 | Smith |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland-Thompson et al. |
| 2019/0377084 A1 | 12/2019 | Sleasman et al. |
| 2019/0379589 A1 * | 12/2019 | Ryan ........................ G06N 3/084 |
| 2019/0391378 A1 | 12/2019 | Eichelkraut et al. |
| 2020/0025888 A1 | 1/2020 | Jang et al. |
| 2021/0190593 A1 | 6/2021 | Yao et al. |
| 2021/0208469 A1 | 7/2021 | Didomenico |
| 2022/0206205 A1 * | 6/2022 | Rubin ................... G02B 27/28 |
| 2022/0214219 A1 | 7/2022 | Faraon et al. |

FOREIGN PATENT DOCUMENTS

| | | | |
|---|---|---|---|
| CN | 101510012 B | 8/2010 |
| CN | 101510011 B | 9/2010 |
| CN | 101241173 B | 8/2011 |
| CN | 202854395 U | 4/2013 |
| CN | 103092049 A | 5/2013 |
| CN | 203799117 U | 8/2014 |
| CN | 204719330 U | 10/2015 |
| CN | 103869484 B | 1/2016 |
| CN | 103257441 B | 10/2016 |
| CN | 205620619 U | 10/2016 |
| CN | 104834079 B | 4/2017 |
| CN | 104834089 B | 6/2017 |
| CN | 106200276 B | 10/2017 |
| CN | 104834088 B | 12/2017 |
| CN | 105676314 B | 1/2018 |

(56)  References Cited

FOREIGN PATENT DOCUMENTS

| CN | 107561857 | A | | 1/2018 | |
| CN | 108089325 | A | | 5/2018 | |
| CN | 208270846 | U | | 5/2018 | |
| CN | 207623619 | U | | 7/2018 | |
| CN | 106199997 | B | | 8/2018 | |
| CN | 108507542 | A | | 9/2018 | |
| CN | 207923075 | U | | 9/2018 | |
| CN | 108680544 | A | | 10/2018 | |
| CN | 108761779 | A | | 11/2018 | |
| CN | 109000692 | A | | 12/2018 | |
| CN | 106199956 | B | | 2/2019 | |
| CN | 109360139 | A | | 2/2019 | |
| CN | 109643068 | A | * | 4/2019 | ......... G03F 7/70633 |
| CN | 106950195 | B | | 5/2019 | |
| CN | 106324832 | B | | 7/2019 | |
| CN | 106526730 | B | | 7/2019 | |
| CN | 106485761 | B | | 8/2019 | |
| CN | 110160685 | A | | 8/2019 | |
| CN | 110678773 | A | | 1/2020 | |
| CN | 213092332 | U | | 4/2021 | |
| CN | 215005942 | U | | 4/2021 | |
| CN | 113050295 | A | | 6/2021 | |
| CN | 110376665 | B | | 8/2021 | |
| CN | 213902664 | U | | 8/2021 | |
| CN | 213903843 | U | | 8/2021 | |
| CN | 214098104 | U | | 8/2021 | |
| CN | 113703080 | A | | 11/2021 | |
| CN | 113791524 | A | | 12/2021 | |
| CN | 113807312 | A | | 12/2021 | |
| CN | 113820839 | A | | 12/2021 | |
| CN | 113834568 | A | | 12/2021 | |
| CN | 113835227 | A | | 12/2021 | |
| CN | 113851573 | A | | 12/2021 | |
| CN | 215010478 | U | | 12/2021 | |
| CN | 110494771 | B | | 1/2022 | |
| CN | 113885106 | A | | 1/2022 | |
| CN | 113899451 | A | | 1/2022 | |
| CN | 113900078 | A | | 1/2022 | |
| CN | 113900162 | A | | 1/2022 | |
| CN | 113906320 | A | * | 1/2022 | ......... G02B 27/4261 |
| CN | 113917574 | A | | 1/2022 | |
| CN | 113917578 | A | | 1/2022 | |
| CN | 113934004 | A | | 1/2022 | |
| CN | 113934005 | A | | 1/2022 | |
| CN | 113959984 | A | | 1/2022 | |
| CN | 114002707 | A | | 2/2022 | |
| CN | 114019589 | A | | 2/2022 | |
| CN | 114047632 | A | | 2/2022 | |
| CN | 114047637 | A | | 2/2022 | |
| CN | 114112058 | A | | 3/2022 | |
| CN | 114156168 | A | | 3/2022 | |
| CN | 114176492 | A | | 3/2022 | |
| CN | 215932365 | U | | 3/2022 | |
| CN | 114280704 | A | | 4/2022 | |
| CN | 114280716 | A | | 4/2022 | |
| CN | 114296180 | A | | 4/2022 | |
| CN | 114325886 | A | | 4/2022 | |
| CN | 114326163 | A | | 4/2022 | |
| CN | 114354141 | A | | 4/2022 | |
| CN | 114373825 | A | | 4/2022 | |
| CN | 114384612 | A | | 4/2022 | |
| CN | 114397092 | A | | 4/2022 | |
| CN | 114397718 | A | | 4/2022 | |
| CN | 114415386 | A | | 4/2022 | |
| CN | 216345776 | U | | 4/2022 | |
| CN | 216351311 | U | | 4/2022 | |
| CN | 216351591 | U | | 4/2022 | |
| CN | 216355281 | U | | 4/2022 | |
| CN | 216361353 | U | | 4/2022 | |
| CN | 114488365 | A | | 5/2022 | |
| CN | 114543993 | A | | 5/2022 | |
| CN | 114545367 | A | | 5/2022 | |
| CN | 114545370 | A | | 5/2022 | |
| CN | 114554062 | A | | 5/2022 | |
| CN | 114561266 | A | | 5/2022 | |
| CN | 216593224 | U | | 5/2022 | |
| CN | 216605227 | U | | 5/2022 | |
| CN | 216622749 | U | | 5/2022 | |
| CN | 114578642 | A | | 6/2022 | |
| CN | 114593689 | A | | 6/2022 | |
| CN | 114623960 | A | | 6/2022 | |
| CN | 114624878 | A | | 6/2022 | |
| CN | 114660683 | A | | 6/2022 | |
| CN | 114660780 | A | | 6/2022 | |
| CN | 217467439 | U | | 6/2022 | |
| CN | 114690387 | A | | 7/2022 | |
| CN | 114740631 | A | | 7/2022 | |
| CN | 114743714 | A | | 7/2022 | |
| CN | 114779437 | U | | 7/2022 | |
| CN | 216896898 | U | | 7/2022 | |
| CN | 216900930 | U | | 7/2022 | |
| CN | 216901121 | U | | 7/2022 | |
| CN | 216901165 | U | | 7/2022 | |
| CN | 216901317 | U | | 7/2022 | |
| CN | 216901952 | U | | 7/2022 | |
| CN | 216903719 | U | | 7/2022 | |
| CN | 216933177 | U | | 7/2022 | |
| CN | 217034311 | U | | 7/2022 | |
| CN | 217034418 | U | | 7/2022 | |
| CN | 217034466 | U | | 7/2022 | |
| CN | 114859446 | A | | 8/2022 | |
| CN | 114859447 | A | | 8/2022 | |
| CN | 114859570 | A | | 8/2022 | |
| CN | 114935741 | A | | 8/2022 | |
| CN | 217276608 | U | | 8/2022 | |
| CN | 217278911 | U | | 8/2022 | |
| CN | 217278915 | U | | 8/2022 | |
| CN | 217278989 | U | | 8/2022 | |
| CN | 217279003 | U | | 8/2022 | |
| CN | 217279087 | U | | 8/2022 | |
| CN | 217279110 | U | | 8/2022 | |
| CN | 217279168 | U | | 8/2022 | |
| CN | 217279244 | U | | 8/2022 | |
| CN | 217280797 | U | | 8/2022 | |
| CN | 217280851 | U | | 8/2022 | |
| CN | 217281621 | U | | 8/2022 | |
| CN | 217281623 | U | | 8/2022 | |
| CN | 114995038 | A | | 9/2022 | |
| CN | 115016099 | A | | 9/2022 | |
| CN | 115016150 | A | | 9/2022 | |
| CN | 115032766 | A | | 9/2022 | |
| CN | 115047432 | A | | 9/2022 | |
| CN | 115047653 | A | | 9/2022 | |
| CN | 115061114 | A | | 9/2022 | |
| CN | 115079415 | A | | 9/2022 | |
| CN | 115113174 | A | | 9/2022 | |
| CN | 217456368 | U | | 9/2022 | |
| CN | 217465697 | U | | 9/2022 | |
| CN | 217466052 | U | | 9/2022 | |
| CN | 217466667 | U | | 9/2022 | |
| CN | 217467162 | U | | 9/2022 | |
| CN | 217467176 | U | | 9/2022 | |
| CN | 217467177 | U | | 9/2022 | |
| CN | 217467226 | U | | 9/2022 | |
| CN | 217467326 | U | | 9/2022 | |
| CN | 217467327 | U | | 9/2022 | |
| CN | 217467336 | U | | 9/2022 | |
| CN | 217467338 | U | | 9/2022 | |
| CN | 217467351 | U | | 9/2022 | |
| CN | 217467352 | U | | 9/2022 | |
| CN | 217467353 | U | | 9/2022 | |
| CN | 217467355 | U | | 9/2022 | |
| CN | 217467357 | U | | 9/2022 | |
| CN | 217467358 | U | | 9/2022 | |
| CN | 217467363 | U | | 9/2022 | |
| CN | 217467364 | U | | 9/2022 | |
| CN | 217467367 | U | | 9/2022 | |
| CN | 217467368 | U | | 9/2022 | |
| CN | 217467395 | U | | 9/2022 | |
| CN | 217467396 | U | | 9/2022 | |
| CN | 217467399 | U | | 9/2022 | |
| CN | 217467452 | U | | 9/2022 | |
| CN | 115164714 | A | | 10/2022 | |
| CN | 115166876 | A | | 10/2022 | |

(56) References Cited

FOREIGN PATENT DOCUMENTS

| | | | |
|---|---|---|---|
| CN | 115166958 A | 10/2022 | |
| CN | 115185082 A | 10/2022 | |
| CN | 115211799 A | 10/2022 | |
| CN | 115236795 A | 10/2022 | |
| CN | 217639515 U | 10/2022 | |
| CN | 217639519 U | 10/2022 | |
| CN | 217639539 U | 10/2022 | |
| CN | 217639544 U | 10/2022 | |
| CN | 217639611 U | 10/2022 | |
| CN | 217639612 U | 10/2022 | |
| CN | 217639613 U | 10/2022 | |
| CN | 217639715 U | 10/2022 | |
| CN | 217639718 U | 10/2022 | |
| CN | 217639719 U | 10/2022 | |
| CN | 217639720 U | 10/2022 | |
| CN | 217639722 U | 10/2022 | |
| CN | 217639723 U | 10/2022 | |
| CN | 217639724 U | 10/2022 | |
| CN | 217639725 U | 10/2022 | |
| CN | 217639726 U | 10/2022 | |
| CN | 217639763 U | 10/2022 | |
| CN | 217639765 U | 10/2022 | |
| CN | 217639767 U | 10/2022 | |
| CN | 217639768 U | 10/2022 | |
| CN | 217639769 U | 10/2022 | |
| CN | 217639770 U | 10/2022 | |
| CN | 217639771 U | 10/2022 | |
| CN | 217639772 U | 10/2022 | |
| CN | 217639773 U | 10/2022 | |
| CN | 217639774 U | 10/2022 | |
| CN | 217639776 U | 10/2022 | |
| CN | 217639777 U | 10/2022 | |
| CN | 217639778 U | 10/2022 | |
| CN | 217639903 U | 10/2022 | |
| CN | 217639920 U | 10/2022 | |
| CN | 115268058 A | 11/2022 | |
| CN | 115327865 A | 11/2022 | |
| CN | 115332917 A | 11/2022 | |
| CN | 115343795 A | 11/2022 | |
| CN | 115390176 A | 11/2022 | |
| CN | 217809433 U | 11/2022 | |
| CN | 217818613 U | 11/2022 | |
| CN | 217819022 U | 11/2022 | |
| CN | 217820828 U | 11/2022 | |
| CN | 217820829 U | 11/2022 | |
| CN | 217820831 U | 11/2022 | |
| CN | 217820834 U | 11/2022 | |
| CN | 217820838 U | 11/2022 | |
| CN | 217820839 U | 11/2022 | |
| CN | 217820840 U | 11/2022 | |
| CN | 217820943 U | 11/2022 | |
| CN | 217820944 U | 11/2022 | |
| CN | 217820945 U | 11/2022 | |
| CN | 217820971 U | 11/2022 | |
| CN | 217821058 U | 11/2022 | |
| CN | 217821068 U | 11/2022 | |
| CN | 217821071 U | 11/2022 | |
| CN | 217821091 U | 11/2022 | |
| CN | 217821110 U | 11/2022 | |
| CN | 217821111 U | 11/2022 | |
| CN | 217821113 U | 11/2022 | |
| CN | 217821122 U | 11/2022 | |
| CN | 217821160 U | 11/2022 | |
| CN | 217821236 U | 11/2022 | |
| CN | 217821680 U | 11/2022 | |
| CN | 217821696 U | 11/2022 | |
| CN | 217822825 U | 11/2022 | |
| CN | 217823690 U | 11/2022 | |
| CN | 217825178 U | 11/2022 | |
| CN | 217885960 U | 11/2022 | |
| CN | 217902220 U | 11/2022 | |
| CN | 217902222 U | 11/2022 | |
| CN | 115421295 A | 12/2022 | |
| CN | 115453754 A | 12/2022 | |
| CN | 115524768 A | 12/2022 | |
| CN | 115524775 A | 12/2022 | |
| CN | 115524874 A | 12/2022 | |
| CN | 217981833 U | 12/2022 | |
| CN | 217981857 U | 12/2022 | |
| CN | 217981991 U | 12/2022 | |
| CN | 217981992 U | 12/2022 | |
| CN | 217982020 U | 12/2022 | |
| CN | 217982038 U | 12/2022 | |
| CN | 217982089 U | 12/2022 | |
| CN | 217982120 U | 12/2022 | |
| CN | 217983382 U | 12/2022 | |
| CN | 217984044 U | 12/2022 | |
| DE | 10 2007 058 558 A1 | 6/2009 | |
| DE | 10 2012 212 753 A1 | 1/2014 | |
| DE | 10 2015 221 985 A1 | 5/2017 | |
| DE | 10 2016 218 996 A1 | 9/2017 | |
| EP | 1 251 397 A2 | 10/2002 | |
| EP | 1 252 623 B1 | 10/2002 | |
| EP | 2 338 114 B1 | 6/2011 | |
| EP | 2884247 A1 * | 6/2015 | ........... G01J 3/0208 |
| EP | 3 226 042 A1 | 10/2017 | |
| EP | 3 385 770 A1 | 10/2018 | |
| EP | 3049859 B1 * | 4/2020 | ......... G02B 27/1066 |
| GB | 2123238 A * | 1/1984 | ........... G02B 7/365 |
| GB | 2 499 869 A | 9/2013 | |
| JP | 2017-062373 A | 3/2017 | |
| KR | 20080099452 A | 11/2008 | |
| KR | 20080103149 A | 11/2008 | |
| KR | 20090002583 A | 1/2009 | |
| KR | 101493928 B1 | 3/2015 | |
| KR | 20170015109 A | 2/2017 | |
| KR | 20180121309 A | 11/2018 | |
| KR | 101905444 B1 | 12/2018 | |
| KR | 102036640 B1 | 10/2019 | |
| WO | WO-2007/141788 A2 | 12/2007 | |
| WO | WO-2008/019803 A1 | 2/2008 | |
| WO | WO-2009/124181 A2 | 10/2009 | |
| WO | WO-2012/172366 A1 | 12/2012 | |
| WO | WO-2015/077926 A1 | 6/2015 | |
| WO | WO-2016/051325 A1 | 4/2016 | |
| WO | WO-2016/191142 A2 | 12/2016 | |
| WO | WO-2017/005709 A1 | 1/2017 | |
| WO | WO-2018/118984 A1 | 6/2018 | |
| WO | WO-2018/134215 A1 | 7/2018 | |
| WO | WO-2018/142339 A1 | 8/2018 | |
| WO | WO-2018/204856 A1 | 11/2018 | |
| WO | WO-2018/218063 A1 | 11/2018 | |
| WO | WO-2018/219710 A1 | 12/2018 | |
| WO | WO-2018/222944 A1 | 12/2018 | |
| WO | WO-2019/015735 A1 | 1/2019 | |
| WO | WO-2019/039241 A1 | 2/2019 | |
| WO | WO-2019/043016 A1 | 3/2019 | |
| WO | WO-2019/057907 A1 | 3/2019 | |
| WO | WO-2019/075335 A1 | 4/2019 | |
| WO | WO-2019/101750 A2 | 5/2019 | |
| WO | WO-2019/108290 A1 | 6/2019 | |
| WO | WO-2019/116364 A1 | 6/2019 | |
| WO | WO-2019/118646 A1 | 6/2019 | |
| WO | WO-2019/119025 A1 | 6/2019 | |
| WO | WO-2019/136166 A1 | 7/2019 | |
| WO | WO-2019/148200 A1 | 8/2019 | |
| WO | WO-2019/164542 A1 | 8/2019 | |
| WO | WO-2019/164849 A1 | 8/2019 | |
| WO | WO-2019/173357 A1 | 9/2019 | |
| WO | WO-2019/198568 A1 | 10/2019 | |
| WO | WO-2019/204667 A1 | 10/2019 | |
| WO | WO-2019/206430 A1 | 10/2019 | |
| WO | WO-2020/001938 A1 | 1/2020 | |
| WO | WO-2020/139752 A1 | 7/2020 | |
| WO | WO-2020214615 A1 * | 10/2020 | ........... G02B 5/1833 |
| WO | WO-2020/248046 A1 | 12/2020 | |

* cited by examiner

200

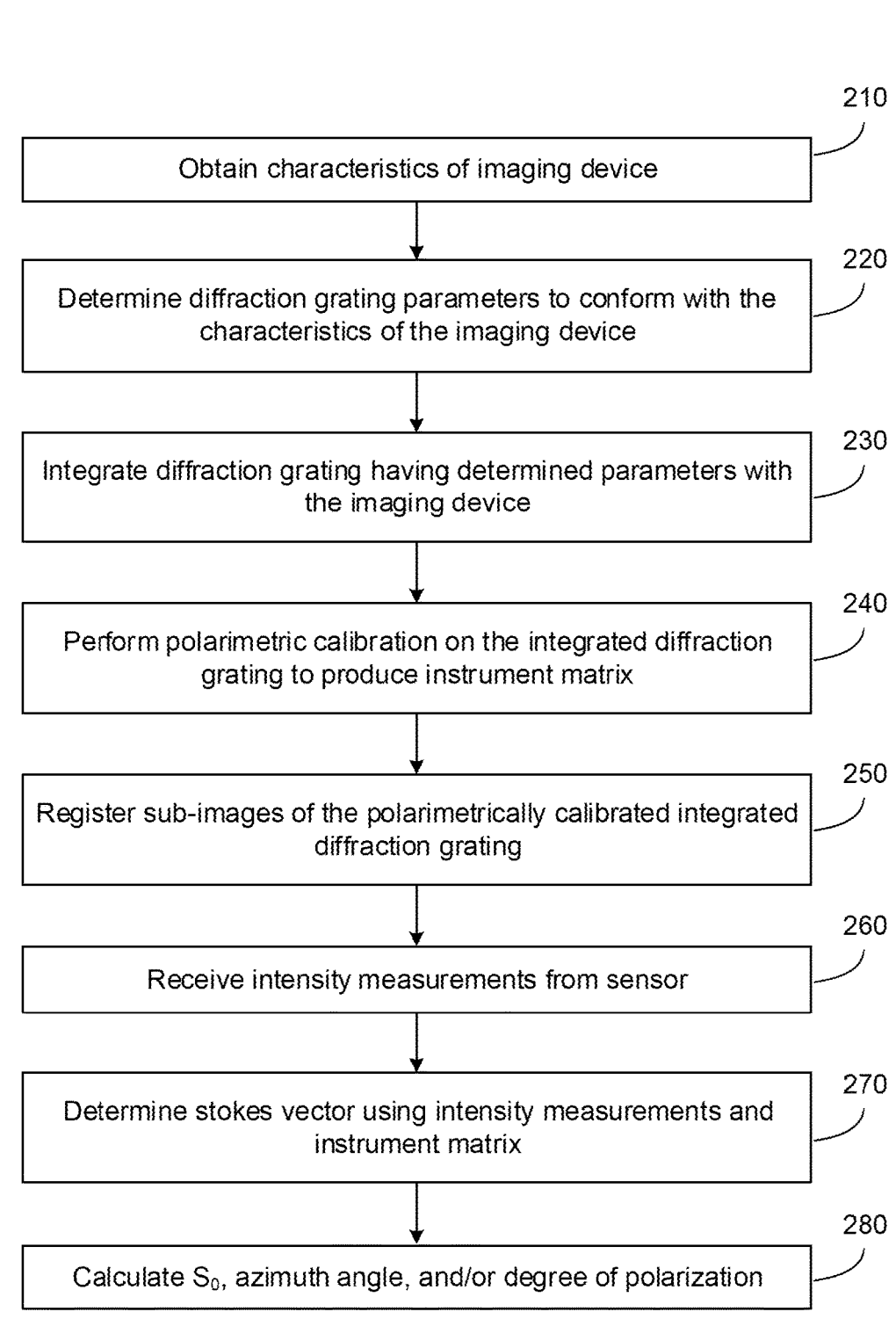

210 Obtain characteristics of imaging device

220 Determine diffraction grating parameters to conform with the characteristics of the imaging device 230 Integrate diffraction grating having determined parameters with the imaging device 240 Perform polarimetric calibration on the integrated diffraction grating to produce instrument matrix 250 Register sub-images of the polarimetrically calibrated integrated diffraction grating 260 Receive intensity measurements from sensor 270 Determine stokes vector using intensity measurements and instrument matrix 280 Calculate $S_0$, azimuth angle, and/or degree of polarization

FIG. 2

— — Simulated

······ Measured

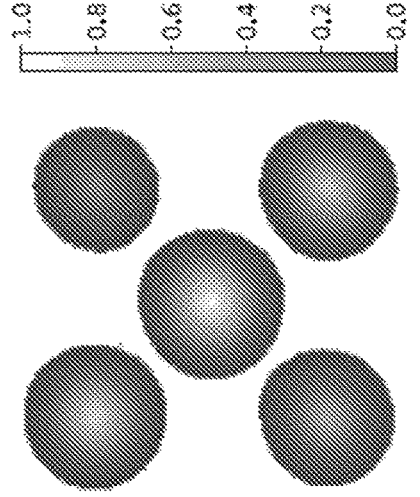
Relative efficiency
FIG. 7C
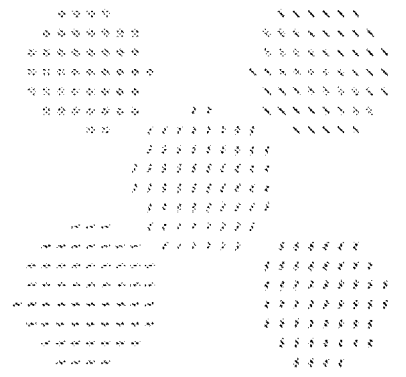
Preferred analyzer state
FIG. 7E
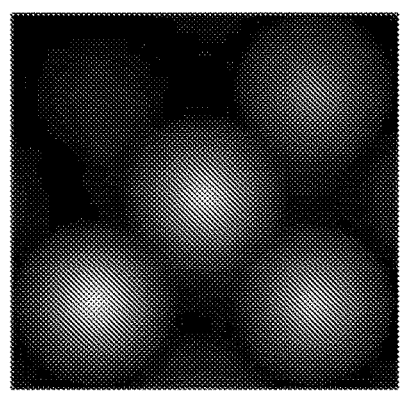
Sample calibration
frame
FIG. 7B
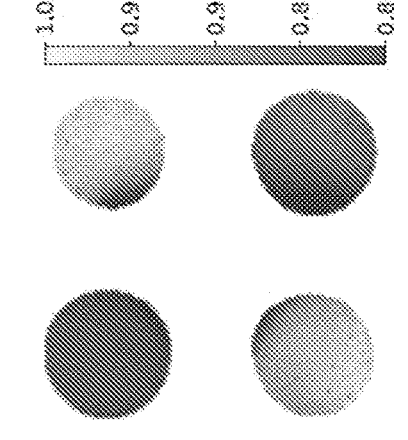
Diattenuation
FIG. 7D

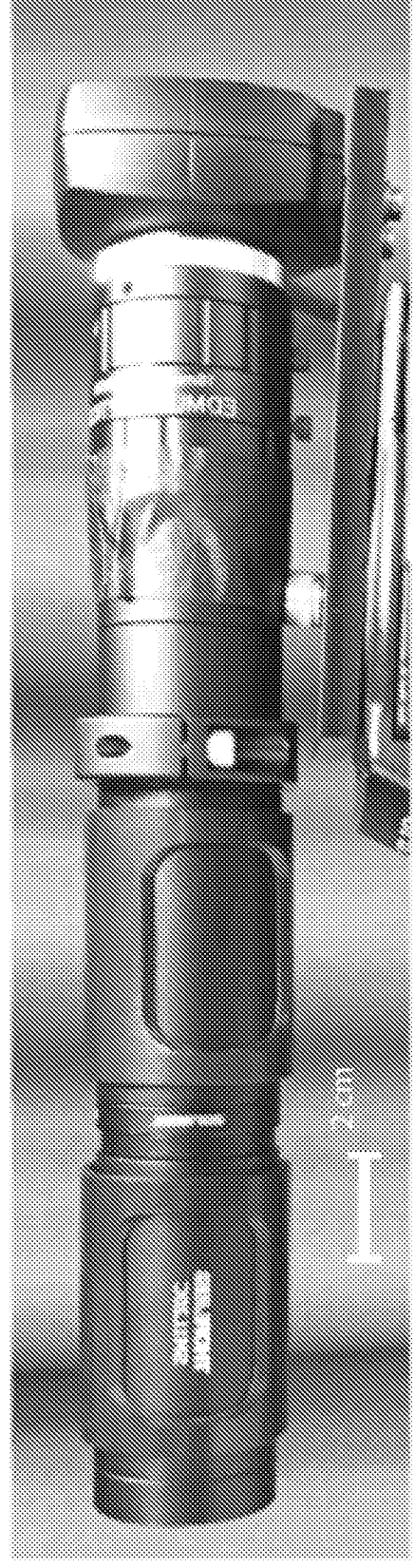
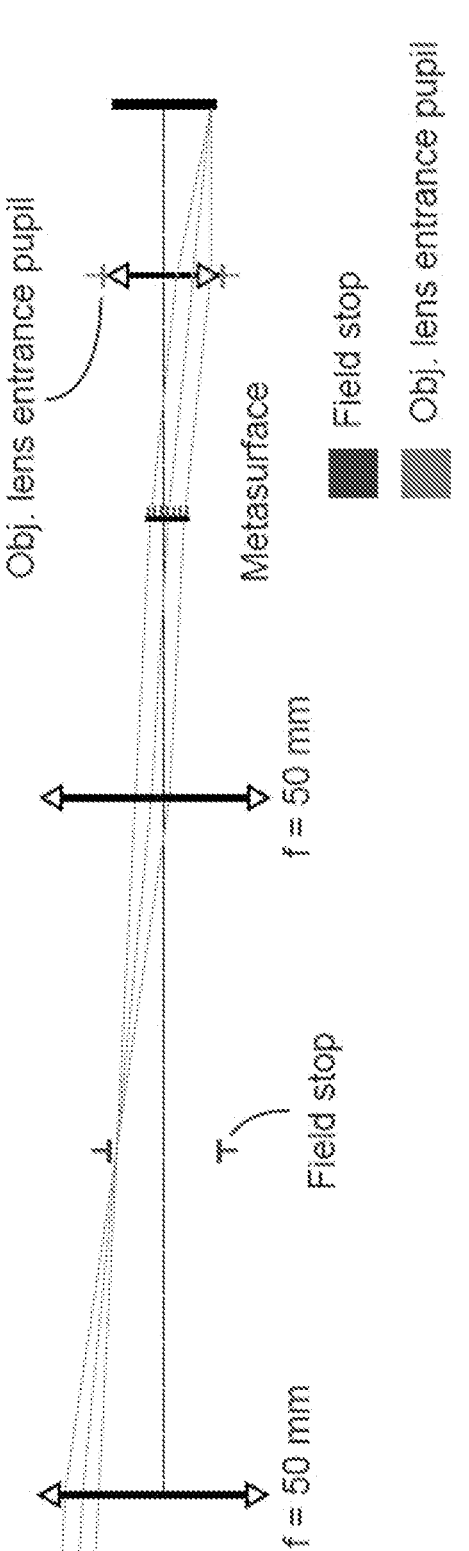
FIG. 9B

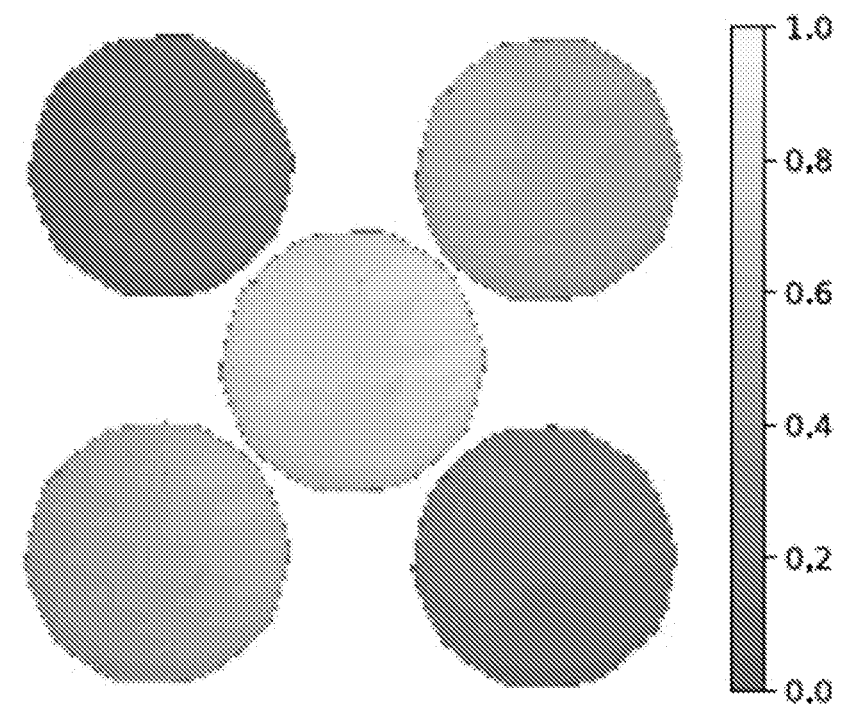
FIG. 9C

Metasurface grating

FIG. 13B

SYSTEMS AND METHODS OF IMAGING POLARIMETRY THROUGH METASURFACE POLARIZATION GRATINGS

CROSS-REFERENCE TO RELATED PATENT APPLICATIONS

This application is a National Stage Entry of International Application No. PCT/US2022/038059, filed Jul. 22, 2022, which claims the benefit and priority to U.S. Provisional Patent Application No. 63/225,162 filed Jul. 23, 2021, the contents of which are incorporated herein by reference in their entirety.

GOVERNMENT LICENSE RIGHTS

This invention was made with government support under 80NSSC20K0318 awarded by the National Aeronautics and Space Administration. The government has certain rights in the invention.

BACKGROUND

Metasurfaces are optical elements to manipulate electromagnetic waves such as light. Metasurfaces may enable various applications that may be impractical to achieve with traditional diffractive lenses. For example, metasurfaces often have a smaller form factor than traditional diffractive lenses and are therefore suited to micro or lightweight applications.

SUMMARY

One embodiment of the present disclosure is an attachment for an intensity-only sensor in an imaging device including a polarization-sensitive diffraction grating configured to receive incident light from a scene, and to modify the incident light to simultaneously (e.g., concurrently, within a same time duration, etc.) produce a plurality of non-overlapping images of the scene, each of a different diffraction order, on the intensity-only sensor to facilitate full-Stokes imaging polarimetry, and a first adjustment mechanism configured to control at least one of: vignetting of the plurality of non-overlapping images on the intensity-only sensor, or an object distance of the imaging device.

In some embodiments, the polarization-sensitive diffraction grating includes a metasurface or a plurality of optical elements each with a dimension that is less than a wavelength of the incident light. In some embodiments, the metasurface or the plurality of optical elements redirects the incident light to produce the plurality of non-overlapping images each of the different diffraction order. In some embodiments, the attachment includes a second adjustment mechanism configured to control at least one of: a deflection angle of the polarization-sensitive diffraction grating, a focal length of the imaging device, or a field of view (FOV) of the imaging device for polarization imaging. In some embodiments, the second adjustment mechanism is configured to electrically deform a substrate of the metasurface to control the focal length of the imaging device. In some embodiments, the second adjustment mechanism is configured to control the FOV according to the focal length of the imaging device and the deflection angle of the polarization-sensitive diffraction grating. In some embodiments, the plurality of non-overlapping images are analyzed according to a set of polarization states corresponding to vertices of a tetrahedron inscribed in a Poincaré sphere. In some embodiments, the attachment is configured to operate with the intensity-only sensor to implement a polarization-sensitive imaging system. In some embodiments, the first adjustment mechanism is configured to control the vignetting according to placement of the polarization-sensitive diffraction grating relative to an entrance pupil of an imaging lens of the imaging device. In some embodiments, the attachment includes passive elements. In some embodiments, the polarization-sensitive diffraction grating operates as an aperture stop or is coupled to an optical aperture operating as the aperture stop, and is coupled to an imaging lens.

Another embodiment of the present disclosure is an imaging device including a polarization-sensitive diffraction grating configured to receive incident light from a scene, and to modify the incident light to simultaneously produce a plurality of non-overlapping images of the scene, each of the different diffraction order, on an intensity-only sensor. The imaging device may include a first adjustment mechanism configured to control at least one of: vignetting of the plurality of non-overlapping images on the intensity-only sensor, or an object distance of the imaging device. The intensity-only sensor may be configured to measure an intensity associated with each of the plurality of non-overlapping images. The imaging device may include a processing circuit including a processor and memory. The memory can have instructions stored thereon that, when executed by the processor, cause the processing circuit to receive the measured intensities associated with each of the plurality of non-overlapping images, and analyze the received measured intensities to produce polarization information including a full-Stokes vector corresponding to the incident light.

In some embodiments, the polarization-sensitive diffraction grating includes a metasurface or a plurality of optical elements each with a dimension that is less than a wavelength of the incident light. In some embodiments, the metasurface or the plurality of optical elements redirects the incident light to produce the plurality of non-overlapping images each of the different diffraction order. In some embodiments, the imaging device includes a second adjustment mechanism configured to control at least one of: a deflection angle of the polarization-sensitive diffraction grating, a focal length of the imaging device, or a field of view (FOV) of the imaging device for polarization imaging. In some embodiments, controlling the focal length of the imaging device includes electronically deforming a substrate of the metasurface. In some embodiments, the second adjustment mechanism is configured to control the FOV according to the focal length of the imaging device and the deflection angle of the polarization-sensitive diffraction grating. In some embodiments, the polarization information corresponds to a set of polarization states corresponding to vertices of a tetrahedron inscribed in a Poincaré sphere. In some embodiments, the imaging device includes an imaging lens, wherein the first adjustment mechanism is configured to control the vignetting according to placement of the polariation-sensitive diffraction grating relative to an entrance pupil of the imaging lens. In some embodiments, the polarization-sensitive diffraction grating includes passive elements.

BRIEF DESCRIPTION OF THE DRAWINGS

For a better understanding of the nature and objects of some embodiments of this disclosure, reference should be made to the following detailed description taken in conjunction with the accompanying drawings.

FIG. 2 is a flowchart of a method for designing a metasurface attachment and performing polarization-sensitive imaging using the metasurface attachment, according to an example embodiment.

FIGS. 7B-7E illustrate a number of measurements associated with calibration using the setup of FIG. 7A, according to various example embodiments.

FIGS. 9A-9C illustrate various considerations associated with placement of a field stop and the effects on vignetting, according to various example embodiments.

FIGS. 13A and 13B illustrate various noise measurements associated with captured images, according to various example embodiments.

Like reference numbers and designations in the various drawings indicate like elements.

DETAILED DESCRIPTION

Figure 1:
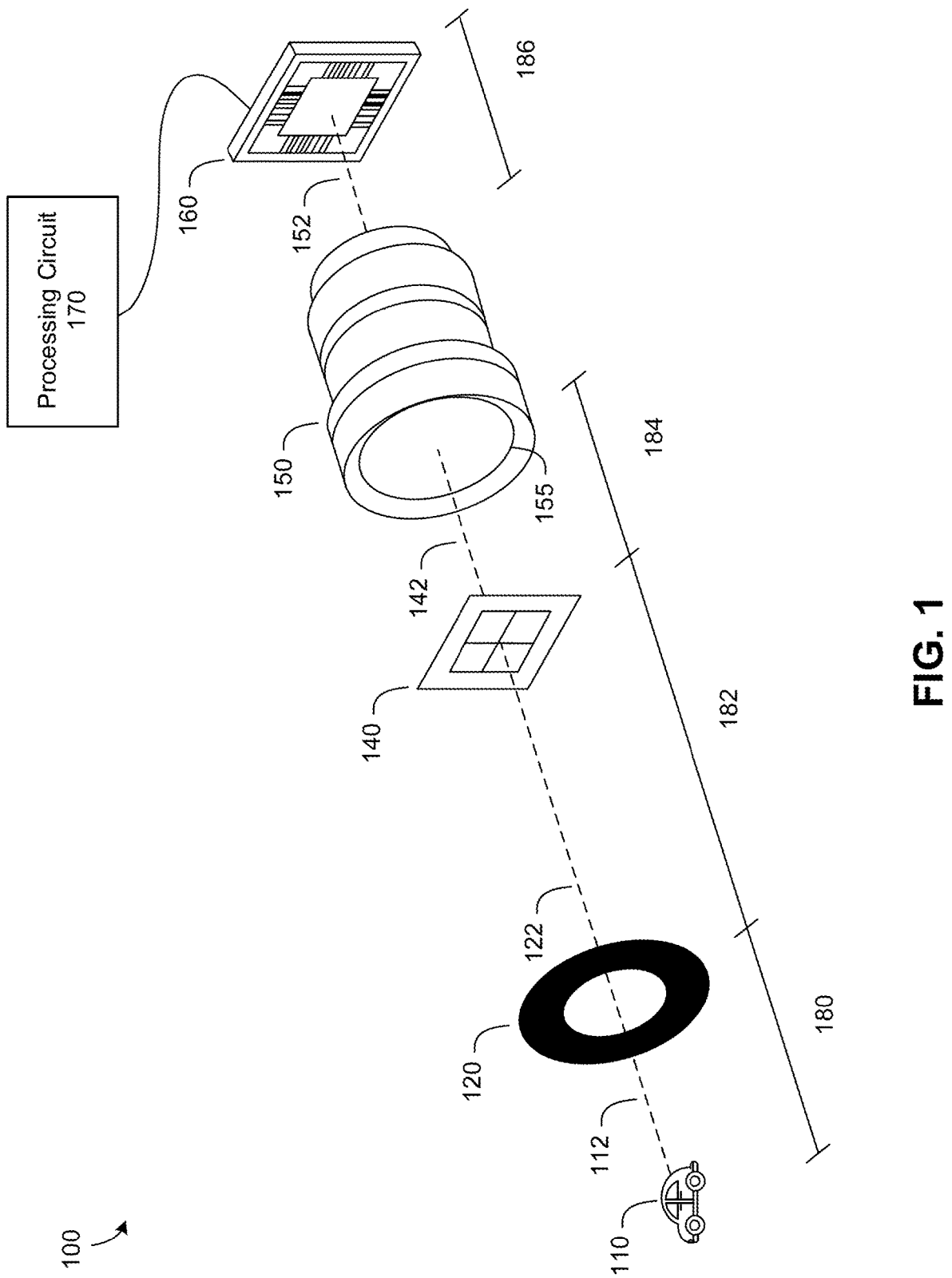
FIG. 1 is a block diagram illustrating a system for performing polarization-sensitive imaging, according to an example embodiment.

Referring now generally to the Figures, described herein are systems and methods of adapting intensity-only imaging systems to enable polarimetric imaging using a metasurface. In various embodiments, polarimetric imaging (e.g., determining polarization information associated with a scene from a captured image) includes determining a Stokes vector associated with a scene. Traditionally, determining polarization information associated with a scene from an image captured by an intensity-only imaging system may require (i) complex modifications to the intensity-only imaging system and (ii) multiple images to be captured by the modified intensity-only imaging system. For example, a traditional intensity-only imaging system may be modified using a set of discrete polarizers and may be used to capture a number of images with manual adjustments to the set of discrete polarizers between capturing each of the number of images.

As used herein, "polarization" describes the path along which light's electric field vector oscillates. In various embodiments, the polarization state of a plane wave is fully constrained by its intensity, the ellipticity and azimuth angles of its polarization ellipse, and the degree to which it is or is not fully polarized, known as the degree of polarization (DOP). The DOP is a measure of the mutual coherence between orthogonal components of the electric field. In various embodiments, the polarization state of a plane wave is represented by the four-element Stokes vector, given by $\vec{S}=[S_0\ S_1\ S_2\ S_3]^T$.

In various embodiments, measuring the Stokes vector (e.g., using an imaging polarimeter, etc.) includes capturing at least four independent intensity measurements. In various embodiments, the four intensity measurements may be separated in time as polarization optics are readjusted, mechanically or otherwise (e.g. division-of-time), along multiple beam paths (e.g. division-of-amplitude), and/or by using a sensor whose pixels are covered with polarization analyzers (e.g. division-of-focal plane). In some embodiments, polarization information is encoded as fringes in the spectral or spatial domains (e.g., as in "channeled" schemes, etc.).

Diffraction gratings may be used to redirect light according to a polarization state of the light. The gratings may be formed from an array of subwavelength-scale pillar elements (e.g., a metasurface, etc.) possessing form birefringence. The grating may include a metasurface which can include an array of subwavelength features that are subwavelength spaced. For example, one or more of the dimensions of the features can be subwavelength relative to the wavelength of the incoming light in vacuum. The one or more of the dimensions of the features can be less than the wavelength of the incoming light in vacuum. The spacing between the features (e.g., periodicity) can be subwavelength (e.g., less than the wavelength of the incoming light). The spacing between the features can be less than the wavelength of the incoming light to avoid Bragg diffraction. The metasurface can include a polarization-sensitive diffraction grating.

In various embodiments, metasurface gratings may be designed to primarily direct light into a desired set of diffraction orders. Each of these diffraction orders may be made to act as an analyzer (e.g., a polarizer) sensitive to polarization states. In various embodiments, measuring the intensity of at least four such orders (e.g., given an appropriate invertible selection of the analyzer polarization states, etc.) yields sufficient information to determine the Stokes vector $\vec{S}$, of light illuminating the grating.

In some embodiments, the Stokes vector $\vec{S}$ may be determined in a single-shot (e.g., in parallel without a time-delay between measurements, or in one frame rather than several frames after a component is mechanically or electrically adjusted, etc.). For example, if light at multiple angles illuminates the grating (e.g., from an object envisioned to be very far away, etc.), four parallel measurement may be obtained in a single-shot to yield the Stokes vector. If the grating is placed in front of an imaging system (and, in some embodiments, its angular field-of-view (FOV) is limited, as discussed in detail below), the four diffraction orders may form four copies of the image of the scene on a sensor, each effectively having been passed through a polarizer for a specific polarization. In various embodiments, the specific polarization may be adjusted by varying the design of the metasurface, as shown in FIG. 3B. Processing the four copies of the image of the scene may facilitate determining $\vec{S}$ across the angular FOV, thereby forming a polarization image.

In various embodiments, an imaging system paired with a metasurface polarization grating is treated as a division-of-amplitude imaging polarimeter. This approach may present a number of unique benefits for polarimetry. For example, using this technique, all beampath division and polarization analysis can be handled by a single, compact optical element, enabling reduced system size without moving parts or active components (e.g., mechanically moving optical component, electrically switching optical element, powered component, etc.). As an additional example, the polarization analysis may be arbitrary (e.g., with respect to any polarization states, with no increase in system complexity). In various embodiments, without the grating, arbitrary polarization analysis can include several sets of birefringent waveplates. Advantageously, use of a metasurface polarization grating facilitates measurement of the full-Stokes vector, including circular polarization. Furthermore, it may also facilitate polarimetry with optimal sets of analyzers which can increase system fidelity and permit reconstruction of $\vec{S}$ with an improved signal-to-noise-ratio (e.g., with a configuration of analyzers whose preferred polarizations occupy the vertices of a tetrahedron in the Poincaré sphere, as described herein). As another example, a metasurface grating may be added to a conventional (e.g., intensity-only) imaging system to convert the conventional imaging system into a polarization imaging system (e.g., capable of full-Stokes polarimetry).

As will be appreciated by one of skill in the art, in some embodiments, the systems and methods described herein may include a metasurface that may be a polarimetry attachment (e.g., for attaching or coupling to, or assembling onto) to an existing camera to convert the existing camera into a polarization imaging system. Advantageously, the polarimetry attachment may convert the existing camera to a polarimetry sensitive unit.

In various embodiments, paraxial geometrical optics may simplify optical analysis/characterization. For example, a multi-element lens may be simplified to its cardinal points (e.g., through Gaussian reduction, etc.). In various embodiments, a photographic objective lens viewed from the outside may be reduced to a collection of two principal planes, nodal points (which may coincide with the principal planes if the refractive index is the same in the image and object space), and front and rear focal points (similarly co-located if the lens has media of identical refractive index on both sides). In various embodiments, the collection provides sufficient information to trace paraxial rays, permitting the functionality of any multi-element system of lenses to be provided by a single lens.

The functionality of a complex multi-element lens system may be provided by an equivalent single lens (from the Gaussian reduction) and a throughput-limiting entrance pupil. This can permit simple design rules for pairing polarization-analyzing gratings with imagining optics.

In some embodiments, systems and methods of the present disclosure relate to camera systems focused on an object located at infinity (e.g., infinite-conjugate systems, etc.). As discussed above, a compound camera objective, as seen from object space, may be abstracted as a throughput-limiting entrance pupil (with a diameter and location along the optical axis) and a set of cardinal points (e.g., a set of principal planes and front and back focal points, spaced equal distances f from the principal planes, where f is the focal length).

In an infinite-conjugate system, a sensor may be placed f behind the rear principal plane so that parallel ray bundles are mapped to a position on the sensor in accordance with their incident angle. For example, each point on the sensor may correspond to a viewing angle in a scene being imaged. Distances in the sensor plane may correspond to swaths of angles.

As described herein, metasurface gratings paired with infinite-conjugate imaging systems may enable imaging polarimetry in which the Stokes vector $\vec{S}$ (or a part thereof) is measured at each pixel. In various embodiments, these metasurface gratings include polarization-dependent phase-shifting elements with subwavelength separation (e.g., such that there is no diffraction from the gap between individual elements, etc.). In various embodiments, a number of polarization-dependent phase-shifting elements are grouped into periodically repeating "unit cells" to form a grating. Light incident on a grating constructed of polarization-dependent phase-shifting elements experiences the collective polarization-dependent effect of the engineered unit cell so that its diffraction orders exhibit a polarizer-like behavior. It should be understood that while the metasurface gratings of the present disclosure are described in relation to square-shaped unit cells repeated on square lattices (e.g., with perpendicular lattice vectors, etc.), other unit cell shapes and/or lattice arrangements are possible.

Referring now to FIG. 1, system 100 (e.g., imaging device) for converting an intensity-only imaging system (e.g., intensity-only machine vision camera) into a polarization-sensitive imaging system is shown, according to an example embodiment. For example, system 100 may capture an image of a scene and generate polarimetry information (e.g., a full-Stokes vector, a partial-Stokes vector, etc.) associated with the scene based on the image. The Stokes vector can include the polarization of light. The full-Stokes vector can include four entries. As another example, system 100 may reflect a mobile phone that has been modified with an attachment to convert a camera of the mobile phone into a polarization-sensitive imaging system. System 100 is shown to include object 110, aperture 120, attachment 140, optics 150, image sensor 160, and processing circuit 170. In some embodiments, system 100 includes a polarizer such as a linear polarizer. In various embodiments, system 100 includes greater, fewer, and/or different components than shown in FIG. 1. For example, in some embodiments, system 100 may not include optics 150. In various embodiments, system 100 includes spacings 180-186 between components of system 100. For example, spacing 182 may be a distance from a back surface of aperture 120 to a front surface of attachment 140. Spacing 180 may be a distance from object 110 to the back surface of aperture 120. Spacing 184 may be a distance from the front surface of attachment 140 to optics 150. Spacing 186 may be a distance from optics 150 to image sensor 160.

Object 110 may be an object imaged or acquired by system 100. For example, object 110 may be a scene having a plurality of elements and system 100 may determine a full-Stokes vector associated with the scene. Aperture 120 may receive incident light 112 and may allow a portion of the incident light to pass to produce reduced light 122. In various embodiments, aperture 120 is a variable aperture. Additionally or alternatively, aperture 120 may be a fixed aperture such as a pinhole aperture. In some embodiments, system 100 does not include aperture 120.

Attachment 140 may modify/manipulate incident light. For example, attachment 140 may modify/adjust/manipulate a phase, amplitude, polarization, depth of field, direction, and/or the like of incident light. In some embodiments, attachment 140 spatially multiplexes incident light to produce one or more images. In various embodiments, the one or more images have different characteristics (e.g., different polarizations, etc.) as described in detail below. In various embodiments, attachment 140 is or includes a metasurface. A metasurface may be an ultrathin planar optical component composed of subwavelength-spaced nanostructures patterned at an interface. An example of the subwavelength-spaced nanostructures is described in U.S. Pat. Pub. No. 2021/0048569, entitled "Polarization state generation with a metasurface" and filed on Jul. 22, 2020, which is hereby incorporated by reference in its entirety for all purposes. Also, an example of the subwavelength-spaced nanostructures is described in U.S. Pat. Pub. No. 2019/0064532, entitled "Transmissive Metasurface Lens Integration" and filed on Aug. 31, 2018, which is hereby incorporated by reference in its entirety for all purposes. In some embodiments, the metasurface may be a specific metasurface such as a metalens, however it should be understood that the metasurface is not limited to such embodiments. In various embodiments, the individual nanostructures facilitate controlling phase, amplitude and polarization of a transmitted wavefront at subwavelength scales (e.g., allowing multiple functions to be multiplexed within a single device, etc.). Attachment 140 may be constructed of or otherwise include titanium dioxide (TiO$_2$) nanopillars. Attachment 140 may be made of a material that is stretchable. Attachment 140 may include TiO$_2$, amorphous silicon, glass, metals, polymers, or plastic. In various embodiments, attachment 140 receives incident light such as reduced light 122 and manipulates the incident light to produce modified light 142. In various embodiments, attachment 140 generates at least four images having different characteristics (e.g., polarizations, etc.) on image sensor 160.

Attachment 140 can be used to transform an intensity-only imaging system into a polarization-sensitive imaging system. Attachment 140 can include a diffraction grating (e.g., grating, polarization-sensitive diffraction grating, etc.). The polarization-sensitive diffraction grating can be configured to receive incident light from a scene. The polarization-sensitive diffraction grating can be configured to modify the incident light. For example, the polarization-sensitive diffraction grating can be configured to modify the incident light to simultaneously (e.g., concurrently, or within a same time duration) produce a plurality of non-overlapping images of the scene. Each of the plurality of non-overlapping images of the scene can be of a different diffraction order. The polarization-sensitive diffraction grating can be configured to modify the incident light to simultaneously produce a plurality of non-overlapping images of the scene on the intensity-only sensor to facilitate full-Stokes imaging polarimetry. The polarization-sensitive diffraction grating can include the metasurface or a plurality of optical elements each with a dimension that is less than a wavelength of the incident light. The metasurface or the plurality of optical elements can redirect the incident light to produce the plurality of non-overlapping images each of the different diffraction order. The plurality of non-overlapping images can be analyzed according to a set of polarization states corresponding to vertices of a tetrahedron inscribed in a Poincaré sphere. The metasurface can include an electrically stretchable metasurface. The electrically stretchable metasurface can tune the grating angle. The attachment 140 can be configured to operate with the intensity-only sensor to implement a polarization-sensitive imaging system. The attachment 140 can be free of active elements. Active elements can include mechanically and/or electrically active optical elements such as an adjustable lenses. The attachment 140 can include passive (e.g., not active, not moveable, etc.) grating elements. The polarization-sensitive diffraction grating can operate as an aperture stop. The polarization-sensitive diffraction grating can be coupled to the optical aperture 120 operating as the aperture stop. The polarization-sensitive diffraction grating can be coupled to an imaging lens.

Attachment 140 can include a first adjustment mechanism. The first adjustment mechanism can be configured to control vignetting of the plurality of non-overlapping images on the intensity-only sensor. The first adjustment mechanism can be configured to control the vignetting according to placement of the polarization-sensitive diffraction grating relative to an entrance pupil of an imaging lens of the imaging device. The first adjustment mechanism can be configured to control an object distance of the imaging device. The first adjustment mechanism can be configured to control spacing 184. For example, the first adjustment mechanism can control (e.g., adjust, modify, change, etc.) the distance from the front surface of attachment 140 to optics 150.

Attachment 140 can include a second adjustment mechanism. The second adjustment mechanism can be configured to control a deflection angle (e.g., grating deflection angle, grating angle, etc.) of the polarization-sensitive diffraction grating. For example, the second adjustment mechanism can change the periodic repetition length of the grating so that each repeating unit is larger or smaller depending on the target angle. The grating can include a plurality of repeating units tiled together. The periodic repetition length can include the size of each repeating unit of the diffraction grating. Changing the periodic repetition length can modify the grating angle and the field of view of the imaging device (e.g., camera). The second adjustment mechanism can be configured to control a focal length of the imaging device. The second adjustment mechanism may deform the substrate of the metasurface to control the focal length of the imaging device. Controlling the focal length of the imaging device can include focusing (e.g., autofocusing, adjusting the zoom mechanically, etc.). The second adjustment mechanism can be configured to control the field of view (FOV) of the imaging device for polarization imaging. The second adjustment mechanism can be configured to control the FOV according to the focal length of the imaging device and the deflection angle of the polarization-sensitive diffraction grating. The second adjustment mechanism can be configured to electrically deform a substrate of the metasurface to control the focal length of the imaging device.

Optics 150 (e.g., an optical assembly/system/device) may be or include one or more optical components such as a diffractive lens (e.g., made of glass or other materials, etc.). In various embodiments, optics 150 receive incident light such as modified light 142 and modify the incident light to produce conformed light 152. In various embodiments, the system of the present disclosure is usable to modify existing cameras to facilitate full-Stokes polarimetry or determination of other physical characteristic(s). For example, an existing camera may include image sensor 160 and processing circuit 170 and system 100 may couple attachment 140 to optics 150 to convert the existing camera to facilitate polarization-sensitive imaging. In some embodiments, system 100 does not include optics 150. In some embodiments, optics 150 includes optics aperture 155. Optics aperture 155 may pass a portion of incident light into optics 150. In some embodiments, the attachment 140 and the optics 150 may be replaced by a metasurface which may include the functionality of the attachment 140 and the optics 150.

Image sensor 160 may measure incident light such as conformed light 152 or modified light 142. In various embodiments, image sensor 160 is a digital photosensor configured to measure various parameters associated with incident light such as intensity, wavelength, phase, etc. Image sensor 160 may be a charge-coupled device (CCD), complimentary metal-oxide-semiconductor (CMOS) device, and/or any other photosensor known in the art. In some embodiments, image sensor 160 has a high frame rate (e.g., 160 frames-per-second, etc.). In various embodiments, image sensor 160 generates a measurement of one or more images. For example, attachment 140 may produce four images on image sensor 160 and image sensor 160 may generate a measurement including intensity values for the four images. Additionally or alternatively, image sensor 160 may generate a measurement including color (e.g., wavelength) values.

Processing circuit 170 may analyze the measurement from image sensor 160 to generate polarization information for instance, as described in detail below. For example, processing circuit 170 may receive intensity measurements corresponding to four images from image sensor 160 and may determine a full-Stokes vector associated with a scene based on the intensity measurements. In various embodiments, processing circuit 170 includes a processor and memory. The memory may have instructions stored thereon that, when executed by the processor, cause processing circuit 170 to perform the various operations described herein. The operations described herein may be implemented using software, hardware, or a combination thereof. Processing circuit 170 may include a microprocessor, ASIC, FPGA, etc., or combinations thereof. In many embodiments, processing circuit 170 may include a multi-core processor or an array of processors. The memory may include, but is not limited to, electronic, optical, magnetic, or any other storage devices capable of providing the processor with program instructions. The memory may include a floppy disk, CDROM, DVD, magnetic disk, memory chip, ROM, RAM, EEPROM, EPROM, flash memory, optical media, or any other suitable memory from which the processor can read instructions. The instructions may include code from any suitable computer programming language such as, but not limited to, C, C++, C#, Java, JavaScript, Perl, HTML, XML, Python and Visual Basic.

The polarization-sensitive diffraction grating can be configured to receive incident light from a scene. The polarization-sensitive diffraction grating can be configured to modify the incident light to simultaneously produce a plurality of non-overlapping images of the scene, each of the different diffraction order, on an intensity-only sensor. The first adjustment mechanism may be configured to control vignetting of the plurality of non-overlapping images on the intensity-only sensor. The first adjustment mechanism can be configured to control an object distance of the imaging device. The intensity-only sensor may be configured to measure an intensity associated with each of the plurality of non-overlapping images.

The processing circuit 170 can include a processor and memory. The memory can include instructions stored thereon that, when executed by the processor, cause the processing circuit 170 to receive the measured intensities associated with each of the plurality of non-overlapping images, and analyze the received measured intensities to produce polarization information including a full-Stokes vector corresponding to the incident light.

The polarization-sensitive diffraction grating can include a metasurface or a plurality of optical elements each with a dimension that is less than a wavelength of the incident light. The metasurface or the plurality of optical elements can redirect the incident light to produce the plurality of non-overlapping images each of the different diffraction order.

The second adjustment mechanism can be configured to control the deflection angle of the polarization-sensitive diffraction grating. The second adjustment mechanism can be configured to control the focal length of the imaging device. Controlling the focal length of the imaging device can include electronically deforming a substrate of the metasurface. The second adjustment mechanism can be configured to control the FOV of the imaging device for polarization imaging. The second adjustment mechanism can be configured to control the FOV according to the focal length of the imaging device and the deflection angle of the polarization-sensitive diffraction grating. Polarimetric information can derive from polarization-sensitive light-splitting by the grating, forming multiple non-overlapping images corresponding to light from a photographic scene analyzed along a set of polarization states. Multiple images can be computationally analyzed to determine the full polarization state of light or the partial polarization state of light.

The polarization information can correspond to a set of polarization states corresponding to vertices of a tetrahedron inscribed in a Poincaré sphere. The optics 150 can include an imaging lens. The first adjustment mechanism can be configured to control the vignetting according to placement of the polarization-sensitive diffraction grating relative to an entrance pupil of the imaging lens. The first adjustment mechanism can control the attachment 140 to be disposed in the entrance pupil of the imaging system with which it is paired to eliminate vignetting. The first adjustment mechanism can control the attachment 140 to be disposed in a position removed from the entrance pupil of the imaging system with which it is pair to produce vignetting. The intensity of vignetting can increase as the attachment 140 is positioned further from the entrance pupil. Vignetting can be controlled by the position at which the attachment 140 is placed in the imaging system. The polarization-sensitive diffraction grating can be free of active elements.

In various embodiments, system 100 is usable in various applications. For example, system 100 may be used in autonomous vehicles to identify surface textures and/or remove glare (e.g., from car windshields, etc.). As another example, system 100 may facilitate material stress analysis. As another example, system 100 may facilitate identifying aerosols. As yet another example, system 100 may facilitate remote sensing (e.g., determining information associated with forest health based on polarimetry information, etc.). In some embodiments, systems and methods of the present disclosure facilitate adapting existing system such as telescopes to enable polarization-sensitive imaging (e.g., for astronomy and astrophysics, etc.). As another example, system 100 may facilitate determining cancer diagnoses using polarization-sensitive imaging of cells/tissue. The system 100 can be used for navigation, vision (e.g., machine vision), drones, automotive applications, or astronomical measurements.

Referring now to FIG. 2, method 200 for determining a Stokes vector associated with a scene is shown, according to an example embodiment. In various embodiments, method 200 may be performed by system 100. For example, an existing intensity-only imaging system may be modified using the attachment 140 as described herein to produce a polarization-sensitive imaging system and the polarization sensitive imaging system may be used to generate a full-Stokes vector for a scene. An intensity-only imaging system may be transformed into a polarization-sensitive imaging system using the attachment 140. At step 210, characteristics of an imaging device may be obtained. In various embodiments, step 210 includes determining a field of view (FOV) for the imaging device (e.g., measured in degrees). In some embodiments, step 210 includes measuring physical dimensions of the imaging device such as a distance between a back surface of an optical element and a front surface of an imaging sensor.

At step 220, diffraction grating parameters that conform to the characteristics of the imaging device are determined. In various embodiments, step 220 includes determining dimensions and a layout of a number of nanostructures such as nanopillars. For example, step 220 may include determining the length, width, and/or orientation angle for a number of nanopillars to conform to a FOV of the imaging device. In various embodiments, step 220 includes generating a unit cell for a diffraction grating that diffracts light into four diffraction orders that act as polarizers for the desired polarization states. In some embodiments, step 220 includes calibrating the polarization-sensitive diffraction grating (e.g., using illumination of known polarization states, etc.).

At step 230, the polarization-sensitive diffraction grating having determined parameters is integrated with the imaging device. For example, the polarization-sensitive diffraction grating may be attached to an existing camera. In various embodiments, step 230 includes positioning the polarization-sensitive diffraction grating in front of an optical element (e.g., a lens, etc.) of a camera. In some embodiments, step 230 includes coupling attachment 140 to a camera that positions the polarization-sensitive diffraction grating relative to the camera optics. In various embodiments, step 230 includes determining a position of the polarization-sensitive diffraction grating relative to a sensor plane of the imaging device. In various embodiments, step 230 includes determining an aperture size for the imaging system. In some embodiments, step 230 includes assembling system 100 (e.g., adding a metasurface attachment to an existing imaging system, etc.).

At step 240, polarimetric calibration is performed on the integrated diffraction grating to produce an instrument matrix. In various embodiments, step 240 includes calibrating the modified imaging system using a light of a known polarization. In various embodiments, step 240 includes calculating/determining the characteristic Stokes vector for each pixel and calibrating across the whole FOV of the modified imaging system using the characteristic Stokes vector for each pixel.

At step 250, sub-images of the polarimetrically calibrated integrated diffraction grating are registered. In various embodiments, step 250 includes registering the sub-images using a test image such as a checkerboard pattern. In various embodiments, step 250 includes segmenting a raw image (e.g., raw image data from an image sensor, etc.) into four sub-images. For example, step 250 may include mapping pixel measurements received from an image sensor to one of four sub-images used to determine the Stokes vector for the image. Mapping of raw image data to polarization state information can be performed on an embedded system (e.g., FPGA).

At step 260, system 100 may receive intensity measurements from a sensor. For example, processing circuit 170 may receive intensity measurements corresponding to a number of images projected onto image sensor 160. In some embodiments, step 260 includes converting one or more analog measurements (e.g., voltage levels, etc.) into digital values. In various embodiments, step 260 includes segmenting the receiving intensity measurements according to the registration performed in step 250.

At step 270, system 100 may determine a Stokes vector using the intensity measurements and the instrument matrix. At step 280, system 100 may calculate the first entry in the Stokes vector, the azimuth angle, and/or the degree of polarization associated with a scene represented by the intensity measurements.

Figure 3A:
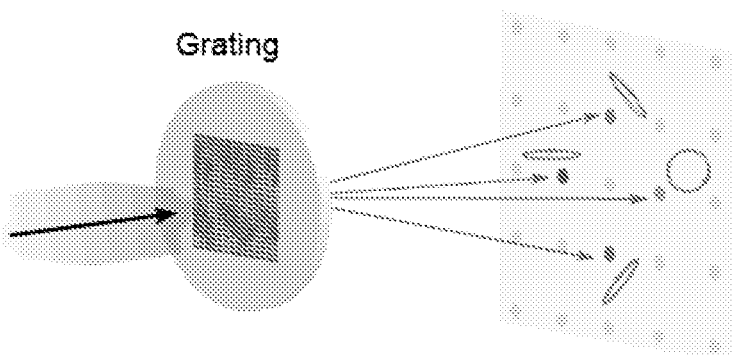
FIGS. 3A-3C illustrate a diffraction grating for generating a set of diffraction orders from incident light, according to various example embodiments.
Figure 3B:
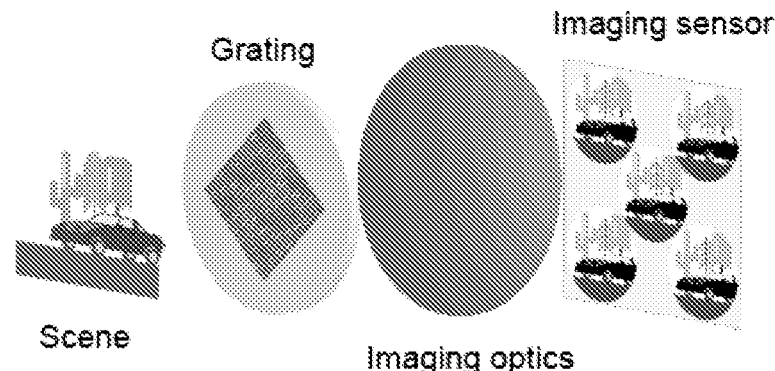

Turning now to FIG. 3A, the diffraction pattern of discrete orders produced by a square lattice metasurface grating may exhibit square symmetry. In various embodiments, the grating is modeled as being in front of an infinite-conjugate imaging system and rotated 45° about the optical axis so that its innermost four diffraction orders (e.g., with indices ($\pm 1$, 0) and (0, $\pm 1$), etc.) form the corners of a square whose sides are aligned with the sensor edges, as shown in FIG. 3B. In various embodiments, when presented/illuminated with light from a faraway scene over a continuous range of incident viewing angles, these four innermost diffraction orders may form four images of a scene on the image sensor.

In various embodiments, the metasurface grating "analyzes" each sub-image with respect to a different polarization state so that the intensity experienced at a given pixel on order n is given by:

$$I_n = \vec{D}_n \cdot \vec{S}_{inc} \tag{1}$$

where $\vec{S}_{inc}$ is the (to-be-determined) incident Stokes vector and $\vec{D}_n$ is the Stokes vector of the polarization for which order n analyzes. In various embodiments, repeating this process over the four orders (e.g., the images of the scene having been aligned and registered to each other) yields a vector of intensity readings $\vec{I}=[I_1 \ I_2 \ I_3 \ I_4]^T$ at each pixel. Therefore, the intensity experienced at a given pixel (e.g., given by the equation above) may be written simultaneously for each order as:

$$\begin{bmatrix} \vec{D}_1^T \\ \vec{D}_2^T \\ \vec{D}_3^T \\ \vec{D}_4^T \end{bmatrix} \vec{S}_{inc} = A\vec{S}_{inc} = \vec{I} \tag{2}$$

where A is the instrument matrix. If A is invertible, then:

$$\vec{S} = A^{-1}\vec{I} \tag{3}$$

In various embodiments, computing the above equation for each pixel generates a full-Stokes image. In various embodiments, the extent to which A can be inverted (e.g., how well-conditioned it is, etc.) changes with the choice of analyzer polarization $\{\vec{D}_n\}$. In various embodiments, the metasurface gratings of the present disclosure implement a configuration of analyzers whose polarizations correspond to a tetrahedron inscribed (e.g., configured, aligned, conformed) in the Poincaré sphere, thereby optimizing the invertibility of A, and consequently the signal-to-noise ratio of the system. In various embodiments, the metasurface grating has one order for circular polarization and the remaining three elliptical polarizations of opposite handedness and equal ellipticity (e.g., with one oriented along the x axis). In various embodiments, the system including a computing device associated with the metasurface grating are calibrated (e.g., to determine A, etc.), as described in detail below.

Figure 3C:
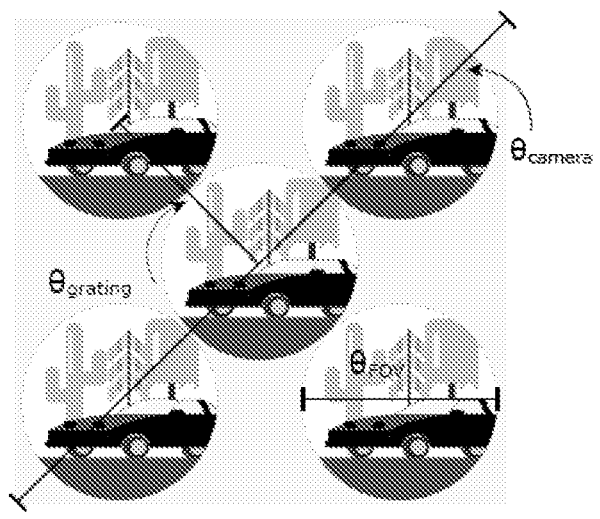

Referring to FIG. 3C, a schematic view of an image as would be seen on the camera sensor is shown, according to an example embodiment. In various embodiments, the FOV of the system may be limited prior to the grating such that the sub-images do not overlap on the camera sensor. In various embodiments, the FOV is limited to be circular. However, it should be understood that the FOV may be limited to other shapes and/or sizes as well.

In various embodiments, distances on the sensor (e.g., a sensor of an imaging device such as an intensity-only camera to which the metasurface grating is coupled, etc.) may be identified with angular quantities (e.g., viewing angle space, etc.). FIG. 3C includes a native diffraction angle of the square grating given by the Bragg condition as:

$$\theta_{grating} = \arcsin\frac{\lambda}{D} \qquad (4)$$

where D is the grating period and $\lambda$ the operation wavelength. In various embodiments, the operation wavelength is $\lambda\sim530$ nm (e.g., as enforced by a bandpass filter placed in front of the system, etc.). However, other operation wavelengths are possible. In various embodiments, the grating angle $\theta_{grating}$ gives the angular separation of each sub-image from the diffraction pattern's center at the zero order.

In various embodiments, the camera system's native diagonal FOV, $\theta_{camera}$, governed by the imaging optics' focal length f and the sensor's side-dimension d is given as:

$$\theta_{camera} = 2\arctan\frac{\sqrt{2d}}{2f} \qquad (5)$$

In various embodiments, the usable FOV over which polarimetry can be performed with the grating without overlap of the sub-images and the zero order (e.g., the diameter of each circle in FIG. 3C) is $\theta_{grating}$. Therefore, it can be written:

$$\theta_{FOV} = \theta_{grating} \qquad (6)$$

In some embodiments, a field stop (e.g., physical aperture limiting the angular bandwidth to which the grating is exposed) is included to limit the camera's FOV to this value (e.g., to prevent unwanted overlap of the sub-images, etc.). In various embodiments, the sensor space occupied by the configuration of the four sub-images and zero order, from corner to corner, spans an angle of:

$$\theta_{images} = 2\left(\theta_{grating} + \arccos\left[\cos^2\left(\frac{\theta_{grating}}{2}\right)\right]\right) \sim 2\left(\theta_{grating} + \frac{\theta_{grating}\sqrt{2}}{2}\right) \qquad (7)$$

where $\sim$ denotes equality in the limit of small $\theta_{grating}$. In various embodiments, if $\theta_{grating}$ is chosen to be too small, the sensor will not be filled to its edges. If it is too large, the subimages may spill over the sensor edges.

Referring now to FIGS. 4A-4D, placement of a metasurface polarization grating implementing a polarimetric attachment (e.g., attachment 140) to an intensity-only imaging system is shown, according to various examples. As shown in FIGS. 4A-4D, a single diffraction order (e.g., polarization channel) is traced using an existing camera system focused at infinity under different placement conditions. In various embodiments, the imaging lens is shown as a co-located entrance pupil and effective "lens" (e.g., set of principle planes).

Figures 4A, 4B, 4C, 4D:
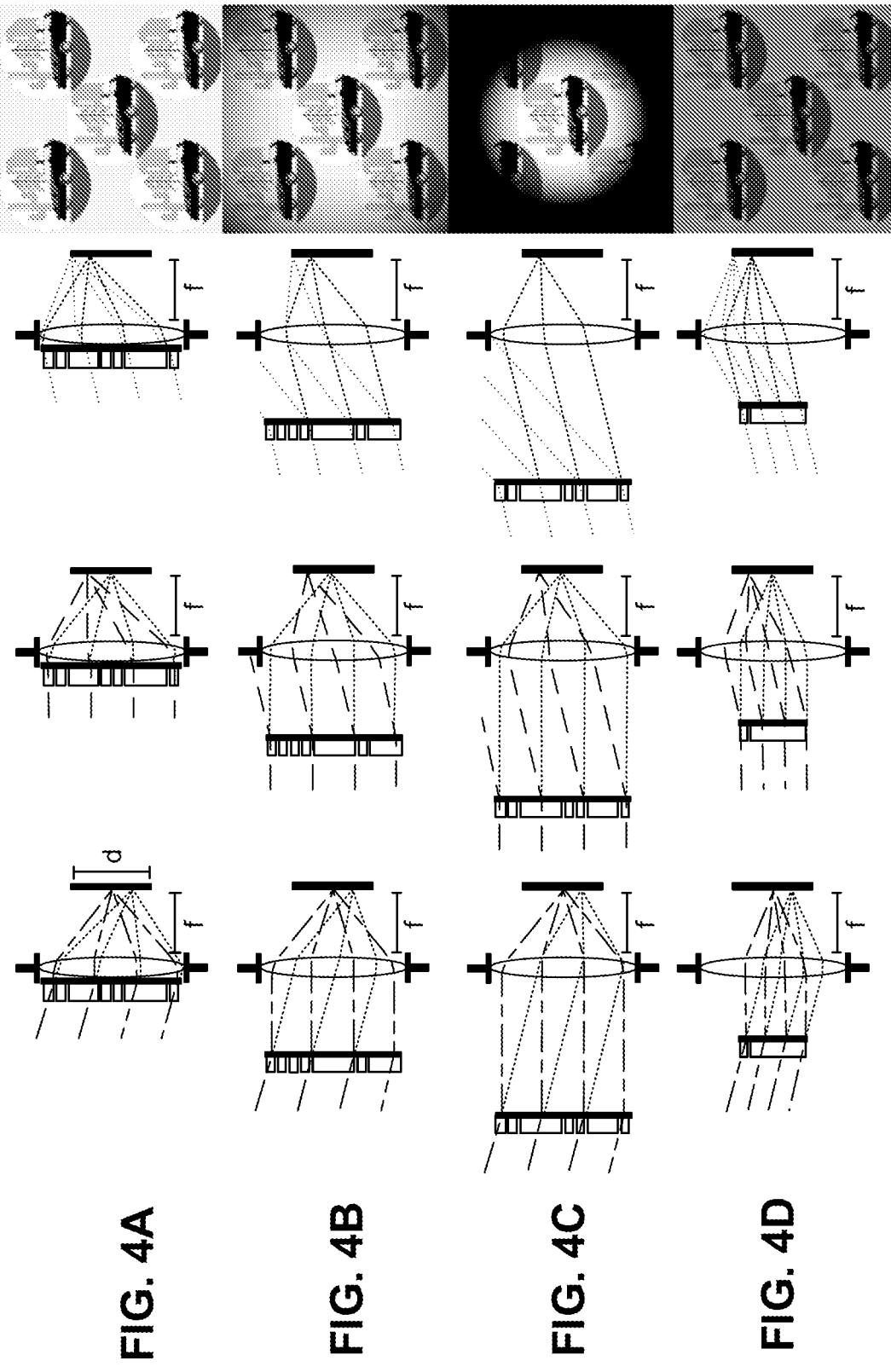
FIGS. 4A-4D illustrate various placements of a diffraction grating relative to an entrance pupil, according to various example embodiments.

In some embodiments, the metasurface polarization grating is positioned in the entrance pupil and sized to fill the entrance pupil, as shown in FIG. 4A. As a result, the incident light may pass through the imaging system and inclusion of the grating would not further limit the system's light throughput.

In various embodiments, when modifying an existing imaging system, placement of the grating in the entrance pupil, aperture stop, or an image thereof may be difficult (e.g., because it can require significant changes to the existing imaging system, etc.). For example, these planes may be inside the objective lens, in between the objective and sensor, or otherwise inaccessible without dismantling the system. Therefore, in various embodiments, the metasurface polarization grating is positioned in front of the existing optical system, as shown in FIG. 4B. In various embodiments, vignetting may occur if the grating remains the same size as the entrance pupil. For example, all rays from one extremal ray field may be imaged, but as the viewing angle changes, some rays may be lost, producing the vignetting effect, as shown in FIG. 4B. As another example, if the grating is further displaced from the entrance pupil, this effect can become so severe that some viewing angles may not contribute to the final image, leading to a sharp cutoff as shown in FIG. 4C (e.g., where the large rectangle represents the grating, the oval represents the lens and entrance pupil, and the small rectangle represents the image sensor). In various embodiments, cutoff may be limited and/or eliminated if the grating is made larger (e.g., with the grating aperture increasing with distance from the entrance pupil, etc.).

In various embodiments, the metasurface grating can be positioned just before a lens housing to avoid a sharp cutoff. In some embodiments, reducing the size of the metasurface polarization grating may have benefits. For example, if the grating's size is reduced so that it becomes the system's aperture stop, extremal viewing angles can fully pass through the imaging optics' entrance pupil, eliminating the vignetting effect, as shown in FIG. 4D. In some embodiments, this configuration is desirable.

Herein follows an example embodiment of a metasurface polarization grating configured to convert an existing intensity-only imaging system into one capable of full-Stokes polarimetry (e.g., a polarization imaging system).

An existing imaging system may include a CMOS imaging sensor paired with a lens with f=16 mm. In various embodiments, the existing imaging system's FOV is $\theta_{camera}$=24.9°.

15

Given $\theta_{camera}$=24.9°, $\theta_{grating}$=7.3° fully utilizes the existing imaging system's FOV. In various embodiments, the grating period may be D=4.17 µm~8λ (e.g., assuming λ=530 nm).

Figure 5B:
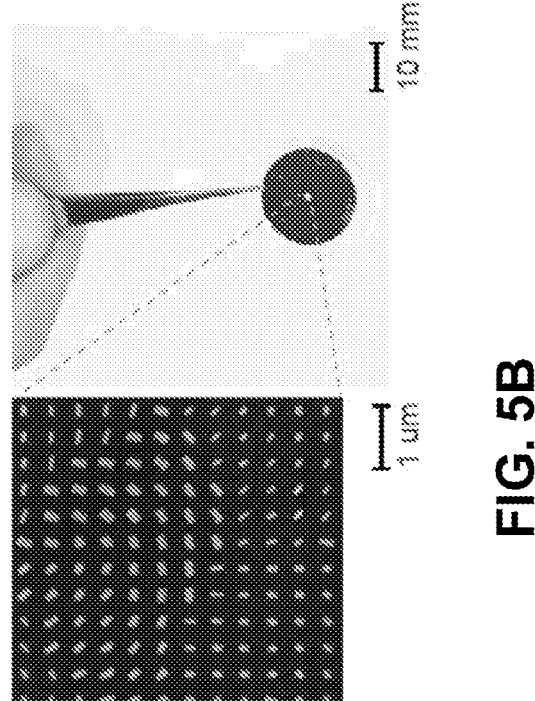
FIGS. 5A-5C illustrate an adaptation of an intensity-only imaging system using a diffraction grating, according to various example embodiments.
Figure 5A:
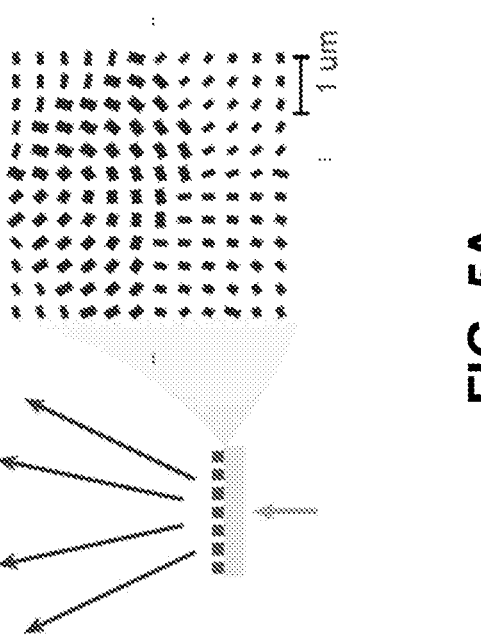

A repeating unit cell of the grating is shown in FIG. 5A in accordance with an embodiment. FIG. 5B illustrates a scanning electron micrograph (SEM) of the grating of FIG. 5A. In various embodiments, a metasurface polarization grating is manufactured (e.g., through a lithographic process, etc.) to implement the grating period. For example, the unit cell of the grating may include a 12×12 array of $TiO_2$ pillars (e.g., each with a subwavelength separation of 420 nm and a height of 600 nm, etc.) having high index contrast to air in the visible (~2.3) and low loss, thereby enabling shape-tunable birefringent phase control. In various embodiments, the parameters of each pillar (e.g., length, width, orientation angle, etc.) in the grating's periodic unit cell are optimized to diffract light into the innermost four diffraction orders of the grating (±1, 0 and 0, ±1) while constraining these orders to act as polarizers for desired polarization states.

Continuing the previous example, the entrance pupil is positioned at 24.4 mm from the front face of the lens. Therefore, in the present example, the metasurface grating is positioned 24.4 mm from the entrance pupil when placed directly in front of the lens housing. In various embodiments, the entrance pupil's size is governed by an adjustable aperture stop with f 1.6 when wide open. Given that f/#=f/$D_{EP}$ and f=16 mm, therefore $D_{EP}$=10 mm.

The grating angle $\theta_{grating}$=6.0° gives the FOV $\theta_{grating}$=$\theta_{FOV}$±3° over which imaging polarimetry can occur. In the present example, the metasurface polarization grating is 1.5 mm in diameter. For example, $D_{EP}$=1.5 mm and d=2.5 cm, which together can mandate that $D_A$=1.1 mm to prevent image overlap. However, this example should be understood to be non-limiting and other configurations (e.g., sizes, etc.) are possible. FIG. 5B illustrates the metasurface polarization grating of the present example.

Figure 5C:
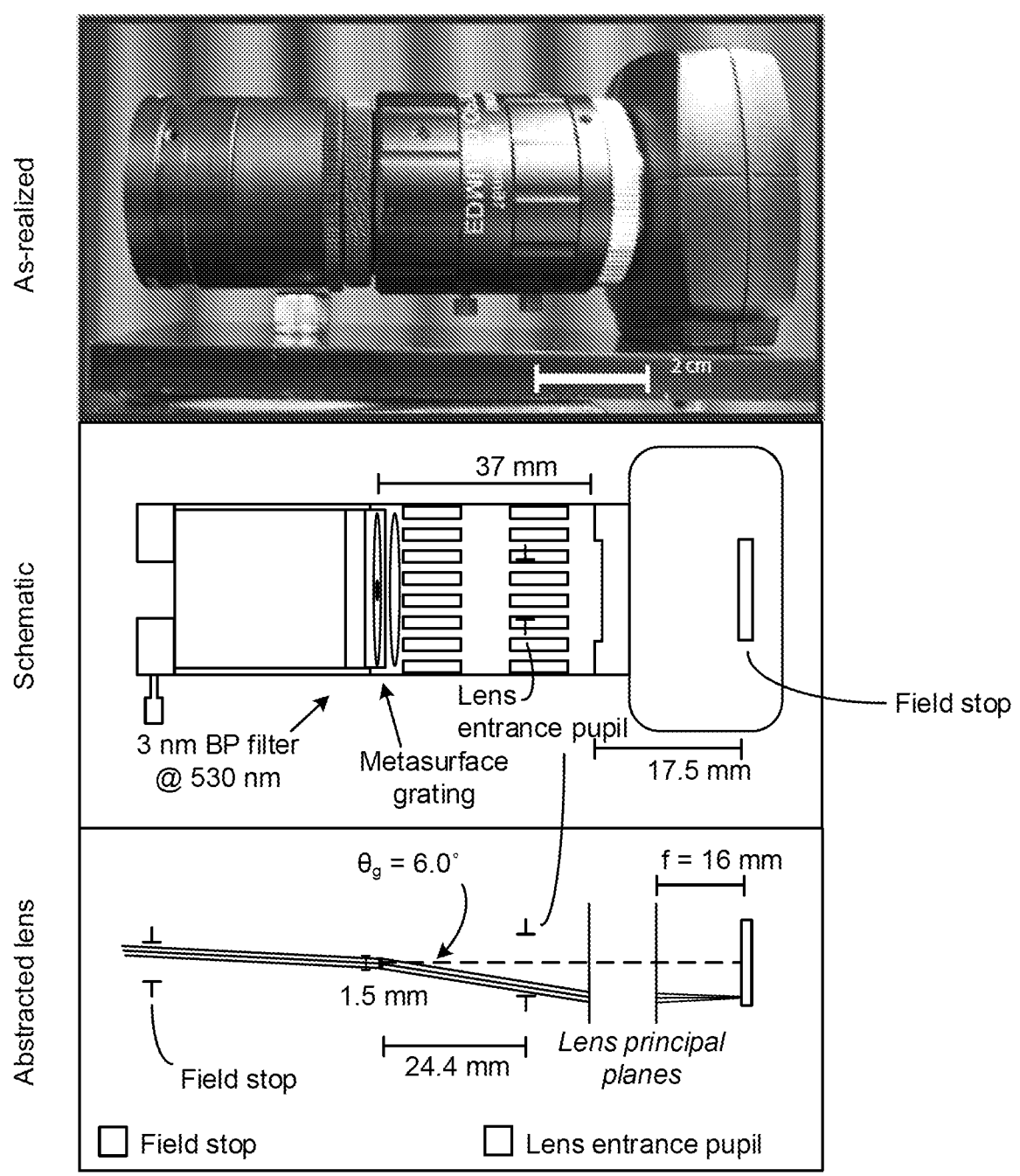

FIG. 5C illustrates an existing imaging system that the polarimetric attachment (e.g., attachment 140) couples to in accordance with an embodiment. In various embodiments, the polarimetric attachment includes a metasurface polarization grating, a chromatic bandpass filter, and an adjustable aperture. The bottom of FIG. 5C illustrates a schematic model of the adapted imaging system.

Figures 6A, 6B:
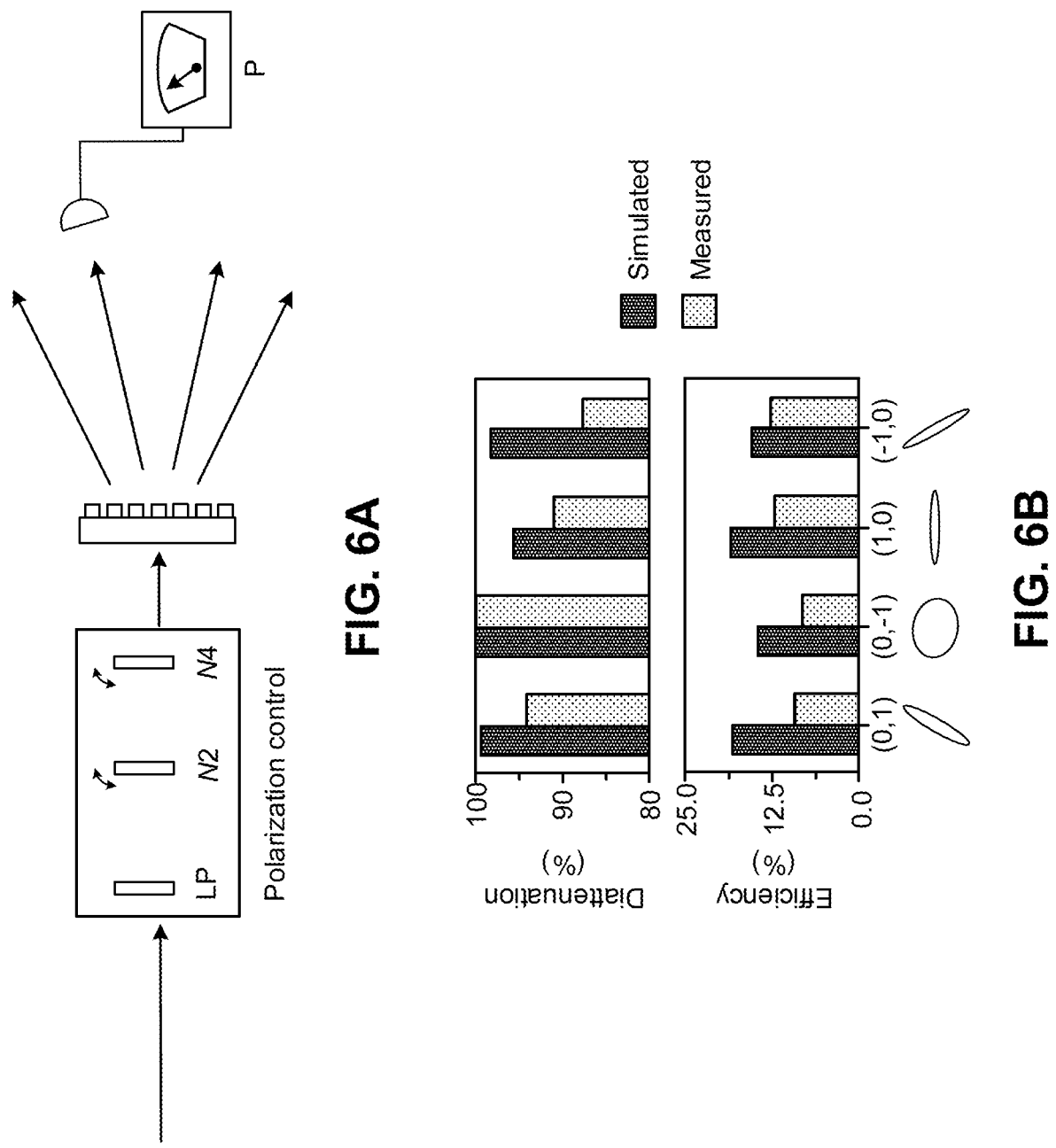
FIGS. 6A-6C illustrate simulated and measured results associated with an intensity-only imaging system modified using the diffraction grating of FIGS. 5A-5C, according to various example embodiments.

In various embodiments, the metasurface polarization grating and/or the adapted imaging system are calibrated (e.g., to determine the instrument matrix A). In some embodiments, this is referred to as "polarimetric calibration." In some embodiments, calibration is performed using the metasurface grating (e.g., without other components of the imaging system, etc.). Stokes polarimetry may be performed to obtain the characteristic four-element Stokes vectors {$\vec{D}_n$} of each of the four orders of interest. For example, the metasurface grating may be illuminated with many (≥4) polarization states with known Stokes vectors and the power response of each order may be measured with a calibrated photodiode so that its characteristic Stokes vector {$\vec{D}_n$} may be determined. In various embodiments, a laser is used with λ=532 nm normally incident on the grating that passes through a polarizer, quarter-, and half-waveplate, with the waveplates in variable rotation mounts, as shown in FIG. 6A.

The first element $D_{0,n}$ of each of $\vec{D}_n$=[$D_{0,n}$ $D_{1,n}$ $D_{2,n}$ $D_{3,n}$]$^T$ may encode the efficiency of the order (e.g., the fraction of incident power that would be directed to order n if unpolarized light were incident, etc.). In various embodiments, a diattenuation of the order may be obtained from each $\vec{D}_n$. The diattenuation of the order may be given as:

$$d_n = \frac{\sqrt{D_{1,n}^2 + D_{2,n}^2 + D_{3,n}^2}}{D_{0,n}} = \frac{I_{max} - I_{in}}{I_{max} + I_{in}} \quad (8)$$

which may also be known as the normalized difference in intensity between the maximum and minimum intensity observable on the order as input polarization varies. In various embodiments, d=1.0 corresponds to a perfect polarizer and d=0 would mean output intensity exhibits no polarization dependence. In various embodiments, $\vec{D}_n$ gives the polarization state to which each order is sensitive (e.g., the input polarization that would produce $I_{max}$) as the normalized Stokes state-of-polarization:

$$\hat{s}_n = \frac{1}{\sqrt{D_{1,n}^2 + D_{2,n}^2 + D_{3,n}^2}} [D_{1,n} D_{2,n} D_{3,n}]^T \quad (9)$$

which can be plotted on the Poincaré sphere and may have a corresponding polarization ellipse.

Figure 6C:
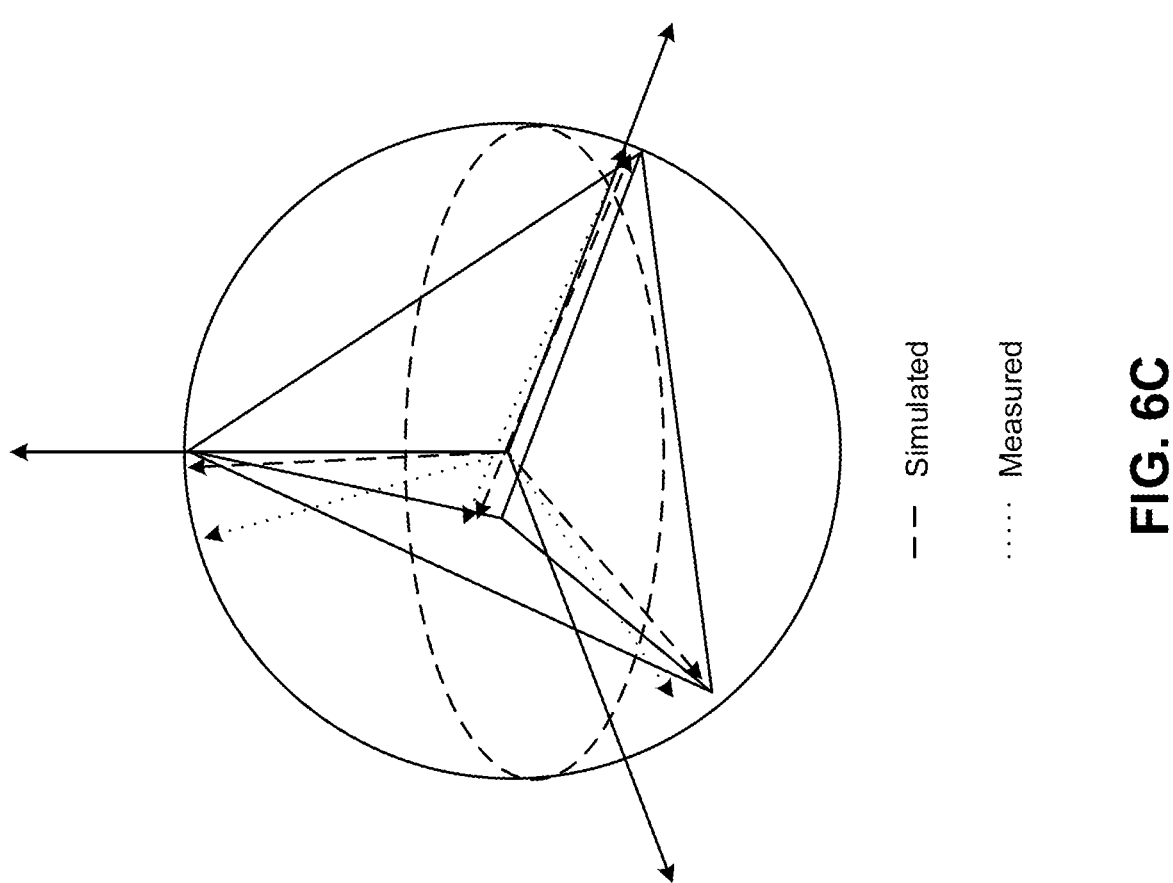

FIGS. 6B-C illustrate the results of this grating-alone measurement, according to several example embodiments. In various embodiments, the simulated results are derived from a full-wave finite-difference time domain (FDTD) simulation of the grating design. Referring specifically to FIG. 6B, the index of each measured diffraction order is given along with the polarization ellipse corresponding to its measured state-of-polarization $\hat{s}_n$. The diattenuation and efficiency of each grating order is also shown. As shown, in some embodiments, the diattenuation of each order exceeds 85%. As used herein efficiency is defined in terms of the fraction of incident power that would be directed to a given order for unpolarized incident light. In various embodiments, for a given input polarization state (e.g., that is not unpolarized), the efficiency of a given order is governed by the order's diattenuation as:

$$e_n(\hat{s}_{in}) = \frac{1}{2}(1 + d_n(\hat{s}_n \cdot \hat{s}_{in})) \quad (10)$$

for a given input polarization with a state-of-polarization $\hat{s}_{in}$. In various embodiments, the sum of the bars gives the efficiency of the four orders as a whole (e.g., a measure of the efficiency of the grating as a whole). In some embodiments, a simulation of the grating design yields a sum efficiency of 65.3%. In some embodiments, the measured sum-efficiency is of 41.5%.

Figure 7A:
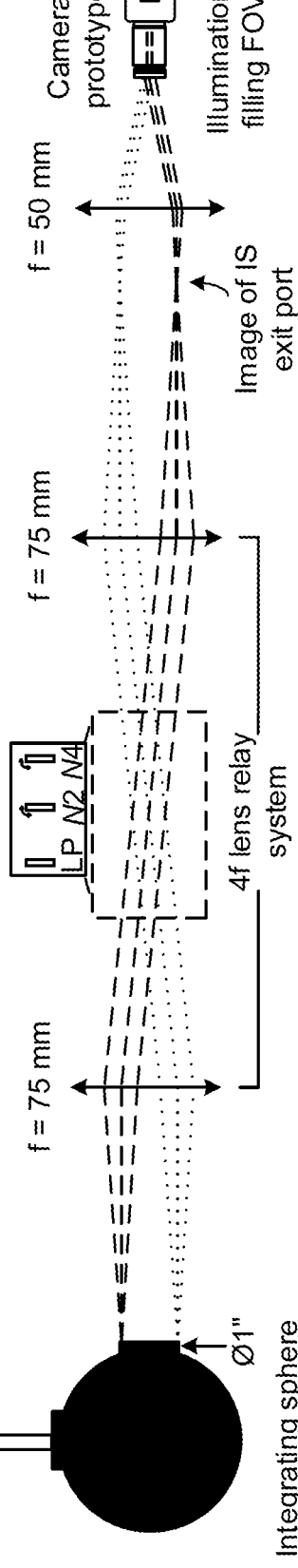
FIG. 7A is a schematic diagram for a setup for calibrating an intensity-only imaging system modified using a diffraction grating, according to an example embodiment.

Referring specifically to FIG. 6C, the analyzer states {$\hat{s}_n$} on the Poincaré sphere alongside the tetrahedron whose vertices these were intended to match are shown, according to an example embodiment. In some embodiments, the difference between the simulated analyzer state and the measured analyzer state can be corrected via calibration. In various embodiments, calibration may be used to improve the performance of the metasurface polarization grating. For example, a scheme that fills the FOV of the camera with light of known polarization states may be used to calibrate the system. FIG. 7A illustrates a calibration setup in accordance with an embodiment. In various embodiments, the exit port of an integrating sphere (IS) illuminated with green LED light is imaged using a 1:1 4f relay system of two lenses of equal focal length. The 4f system may provide a collimated space in which polarization optics (e.g., a linear polarizer, rotating quarter- and half-waveplates, etc.) can be positioned. In some embodiments, the IS exit port, and its image created after the 4f system, is an extended source of uniform radiance that, when passed through a final lens one f away, may be made to fill the camera's entrance pupil (e.g., which is now the metasurface grating).

In various embodiments, the sensor plane is conjugate to the integrating sphere exit port and four sub-images (plus the zero order) are formed on the sensor. FIG. 7B illustrates a sample frame of the calibration, according to an example embodiment. As shown, the incident polarization state may be nearly orthogonal to the analyzer state of the upper right order which appears dark. In various embodiments, comparing the intensity response of each pixel in each sub-image to a set of known polarization states generated by rotating the waveplates may facilitate calculating a $\vec{D}_n$ for each pixel. In various embodiments, this enables simultaneous calibration across the whole FOV with the entire instrument as-assembled (e.g., the existing imaging system with metasurface polarization grating attachment).

FIGS. 7C-E illustrate results of the calibration, according to several example embodiments. FIG. 7C illustrates the efficiency (e.g., relative efficiency normalized by the highest value, etc.) of each point $D_{0,n}$ in each channel in the FOV. FIG. 7D illustrates the diattenuation plotted across the field-of-view. In various embodiments, at the center of each channel, the diattenuation is consistent with the values plotted in FIG. 6B. FIG. 7E illustrates the polarization ellipse preferred by each point in the FOV (i.e., the polarization ellipse corresponding to each $\hat{s}_n$).

Figure 8A:
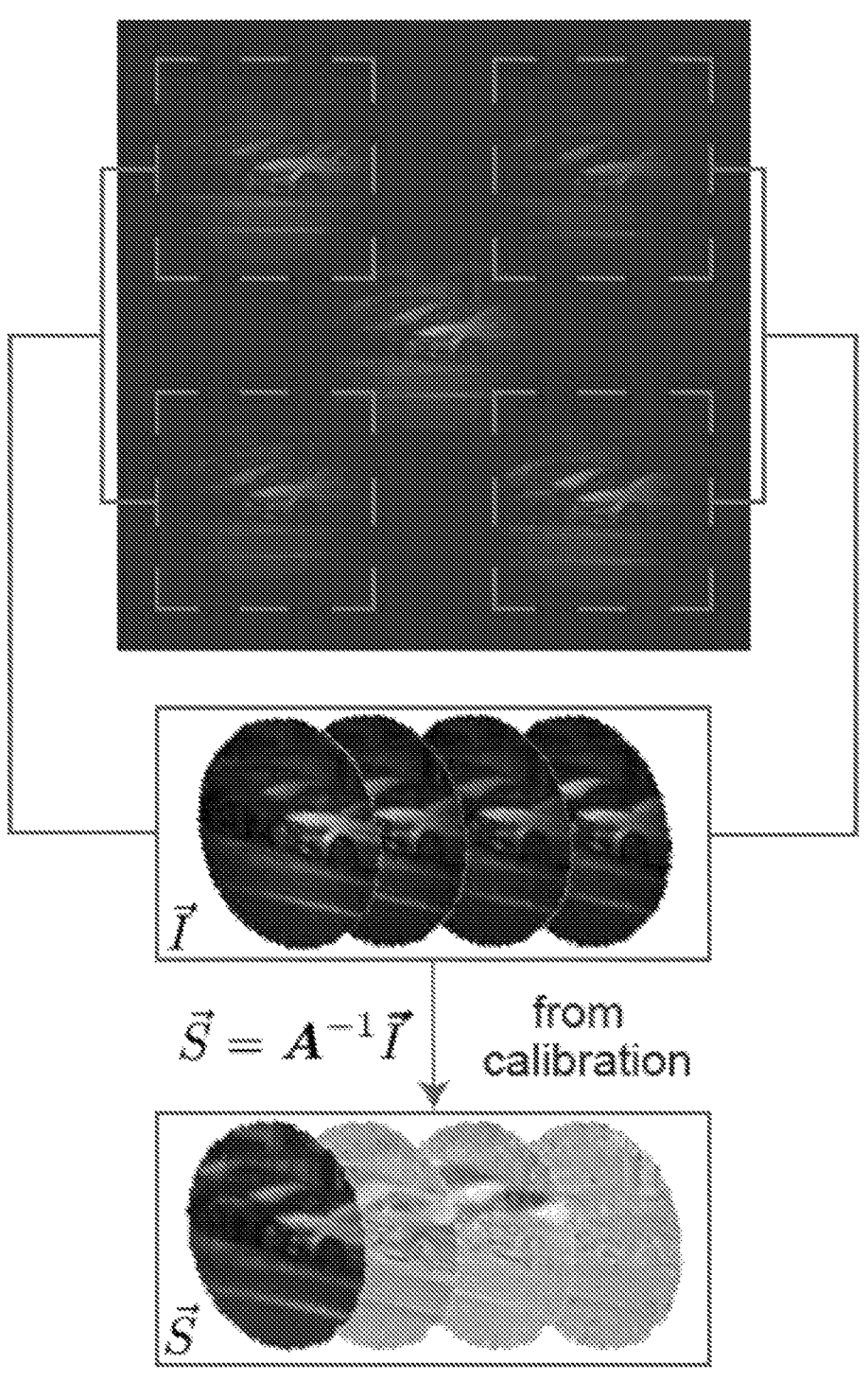
FIGS. 8A-8B illustrate a number of measurements associated with polarization imaging of an intensity-only imaging system modified using a diffraction grating, according to various example embodiments.

In various embodiments, the assembled camera (e.g., an intensity-only imaging system with a metasurface attachment to convert the intensity-only imaging system into a polarization imaging system) may perform polarization imaging of objects. In some embodiments, the assembled camera is calibrated before performing polarization imaging of objects. FIG. 8A illustrates an example frame of raw data captured by a conventional imaging device equipped with the metasurface polarization grating attachment. In various embodiments, the sub-images are registered to one another. Registering the sub-images to one another may include (i) taking a photo of a feature-rich image (e.g., such as checkerboard pattern), (ii) selecting one quadrant as a reference for the others, and (iii) using autocorrelation to determine the amount by which each image should be shifted to achieve registration. Registering the sub-images may facilitate a segmentation of each raw exposure into four sub-images. In various embodiments, each of the sub-images constitutes an entry in the vector of intensity readings $\vec{I}$ described above. In various embodiments, the calibration process produces a pixel-wise $A^{-1}$, thereby facilitating computation of a Stokes vector image.

In various embodiments, systems and methods of the present disclosure may facilitate generating results from polarization images (e.g., as captured using the metasurface attachment). For example, scalar quantities such as (i) $S_0$ (e.g., the first entry of the Stokes vector also known as the intensity), (ii) the azimuth angle of the polarization ellipse (e.g., given by $\frac{1}{2}$ arc tan $$\frac{S_2}{S_1}),$$

and (iii) the degree or polarization (e.g., given by $$\sqrt{S_1^2 + S_2^2 + S_3^2/S_0}).$$

Figure 8B:
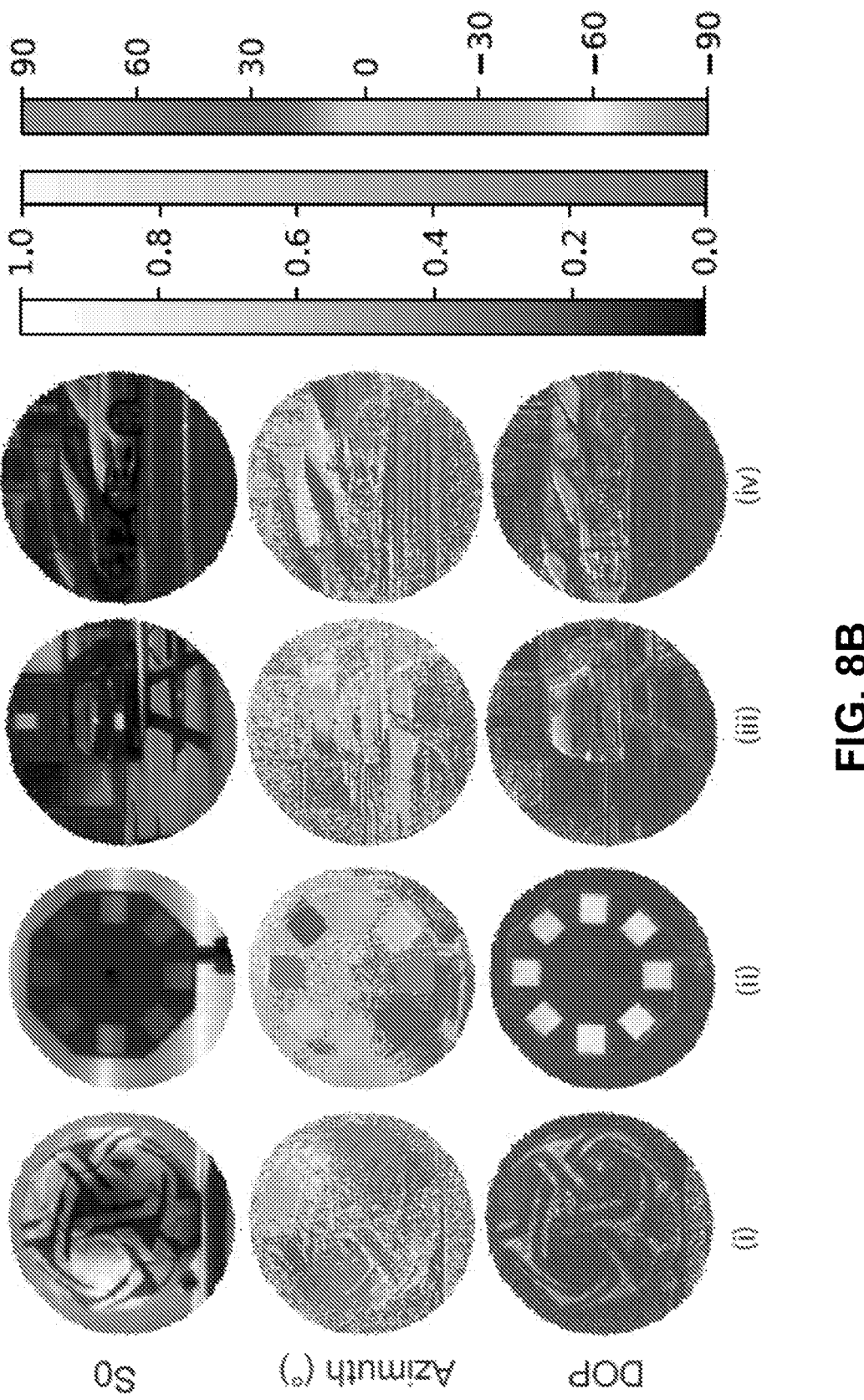

Referring now to FIG. 8B, several examples of polarimetric imaging using the systems and methods described herein are shown. Applications of polarimetric imaging may include inspection of liquid crystal display panels during manufacturing, target detection in camouflaged backgrounds, and remote sensing (e.g., such as in Earth sciences and astrophysics, etc.). In various embodiments, polarization imaging facilitates determining the azimuthal orientation of a specular surface's surface normal vector (e.g., the surface normal's projection in the viewing plane). The first and second columns (e.g., columns (i) and (ii)) of FIG. 8B illustrate images of an indoor scene under diffused LED illumination. The third and fourth columns (e.g., columns (iii) and (iv)) of FIG. 8B illustrate images of an outdoor scene including cars under direct sunlight.

The metasurface can be compact. Polarimetry with the metasurface can use a "division-of-amplitude" scheme with all beam-division and polarization analysis performed in a single plane by a single optical element. This can enable streamlined optical systems along a single axis with a single sensor, providing for simple, more easily calibrated instrument designs. The metasurface could be integrated in any part of a system's optical train, such as just before the sensor.

Metasurfaces can also present an efficiency advantage. Determination of the four-element Stokes vector can have, at minimum, four projective polarization state measurements. Using traditional components, polarimetry using this minimal number of measurements (e.g., 4) can discard at least 50% of incident light. Lossless polarization elements can perform polarization state analysis while redirecting discarded light to another channel. However, as these can be based on birefringent crystals, such a device (e.g., a polarization beamsplitting cube or a Wollaston prism) may only distinguish between orthogonal polarization states. However, this constraint can mean that no minimal four measurement scheme for the Stokes vector can be construed from these optics. Mathematically speaking, its 4×4 instrument matrix A would contain two sets of orthogonal Stokes vectors and would be singular. Using traditional optics, then, a lossless polarimetry scheme may take at least six measurements, such as the six measurement scheme in Stokes' own definition of the Stokes parameters. A minimal four measurement scheme, using traditional optics, may resort to absorptive polarizers, mandating at least a 50% loss, limiting the SNR an optical system may achieve in a given integration time.

Metasurfaces, however, can circumvent this limit. A metasurface grating can be a generalization of a Wollaston prism or polarization beamsplitter cube with multiple output channels that may be specified without an orthogonality constraint. A metasurface can implement a four measurement scheme with greater than 50% efficiency.

Metasurfaces can offer simultaneity. In many applications, a division-of-time approach (in which a polarization analyzer switches and images are acquired) can be standard. All four of the metasurface's polarization channels can be acquired simultaneously, so that transients (atmospheric fluctuations, for instance) are common mode noise.

A metasurface diffraction grating may be used as a polarimetric attachment (e.g., attachment 140) to an intensity-only imaging system, enabling full-Stokes imaging polarimetry. Metasurfaces may serve as a new component in the toolkit of polarization optics. Metasurfaces may find broad use in the design of polarization-sensitive optical systems for machine vision and remote sensing applications.

Figure 9A:
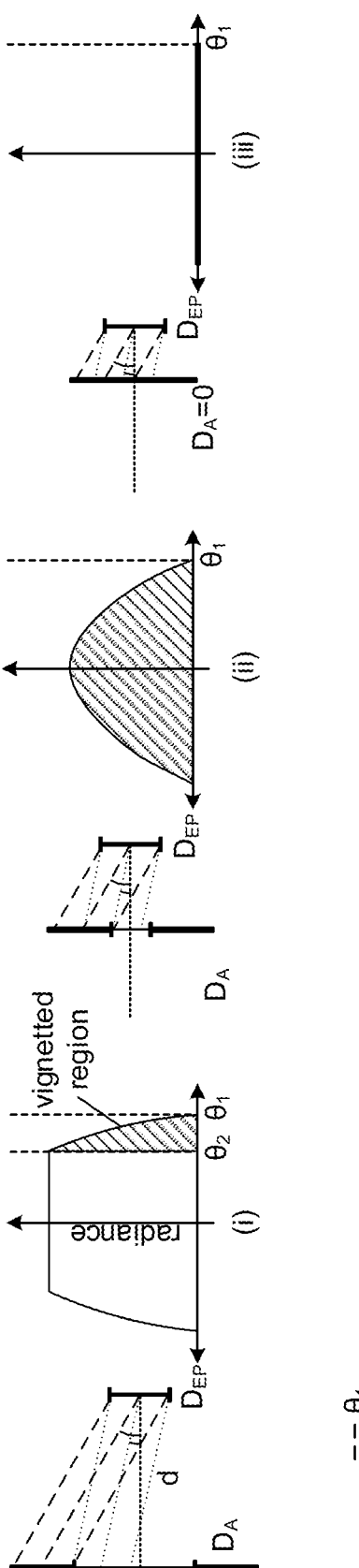

Referring to FIG. 9A, results associated with different placements of an aperture are shown, according to various embodiments. In various embodiments, $\theta_1$ represents the viewing angle beyond which no light can be images and $\theta_2$ represents the viewing angle at which the entire entrance pupil is illuminated. In various embodiments, proper placement of an aperture is important to prevent vignetting. For example, as shown in example (i) vignetting occurs when the entrance pupil (e.g., the metasurface) and the aperture are separated by a distance d. In example (ii) the entrance pupil is moved closer to the aperture which results in no viewing angles passing the system without vignetting. In example (iii) the entrance pupil is moved even close to the aperture which results in total vignetting (e.g., no image). $\theta_1$ and $\theta_2$ are given by:

$$\theta_1 = \arctan\left(\frac{D_A - D_{EP}}{2_d}\right) \quad (11)$$

$$\theta_1 = \arctan\left(\frac{D_A - D_{EP}}{2_d}\right) \quad (12)$$

To avoid image overlap, the following can hold:

$$\theta_2 = \left(\frac{\theta_{FOV}}{2}\right) \quad (13)$$

Together, Equations 11 and 13 can govern how the field stop diameter $D_A$ should be set. Pictorially, the aperture can be adjusted so that the bottom-most ray corresponding to $\theta_1$ in FIG. 9A just touches the top of the aperture. Viewing angles between $\theta_1$ and $\theta_2$ can be vignette. Angles between $\theta_2$ can be imaged with no vignetting.

As the aperture is moved closer to the grating/entrance pupil, $D_A < D_{EP}$ can hold to satisfy Equation 13. This is shown in FIG. 9A (ii). Then, $\theta2$ crosses 0 and no longer exists. That is, in situation (ii), no viewing angles pass the system without vignetting. The penalty of being able to place a smaller aperture closer is an overall decrease in radiative throughput over the entire FOV.

If the field stop is moved closer, upon reaching the separation distance in the following equation, the situation shown in FIG. 9A (iii) can arise in which only DA=0 can prevent image overlap.

$$d = \frac{\frac{D_{EP}}{2}}{\tan\frac{\theta_{grating}}{2}} \quad (14)$$

In Equation 14, $\theta_{grating}$ is the grating angle. Situation (iii) can be a limiting case of (ii) in which the vignetting is total. The aperture may not be placed any closer than this to act as a field stop.

Referring to FIGS. 9B-9C, a test for determining an aperture placement is shown, according to an example embodiment. As shown, the test setup includes two f=50 mm lenses positioned before a metasurface grating. An adjustable iris implements a field stop. FIG. 9C illustrates the relative efficiency obtained using the test setup. As shown, the relative efficiency is highly uniform over each field, with no clear vignetting, thereby illustrating that vignetting may be avoided using a longer system.

Figures 10A, 10B:
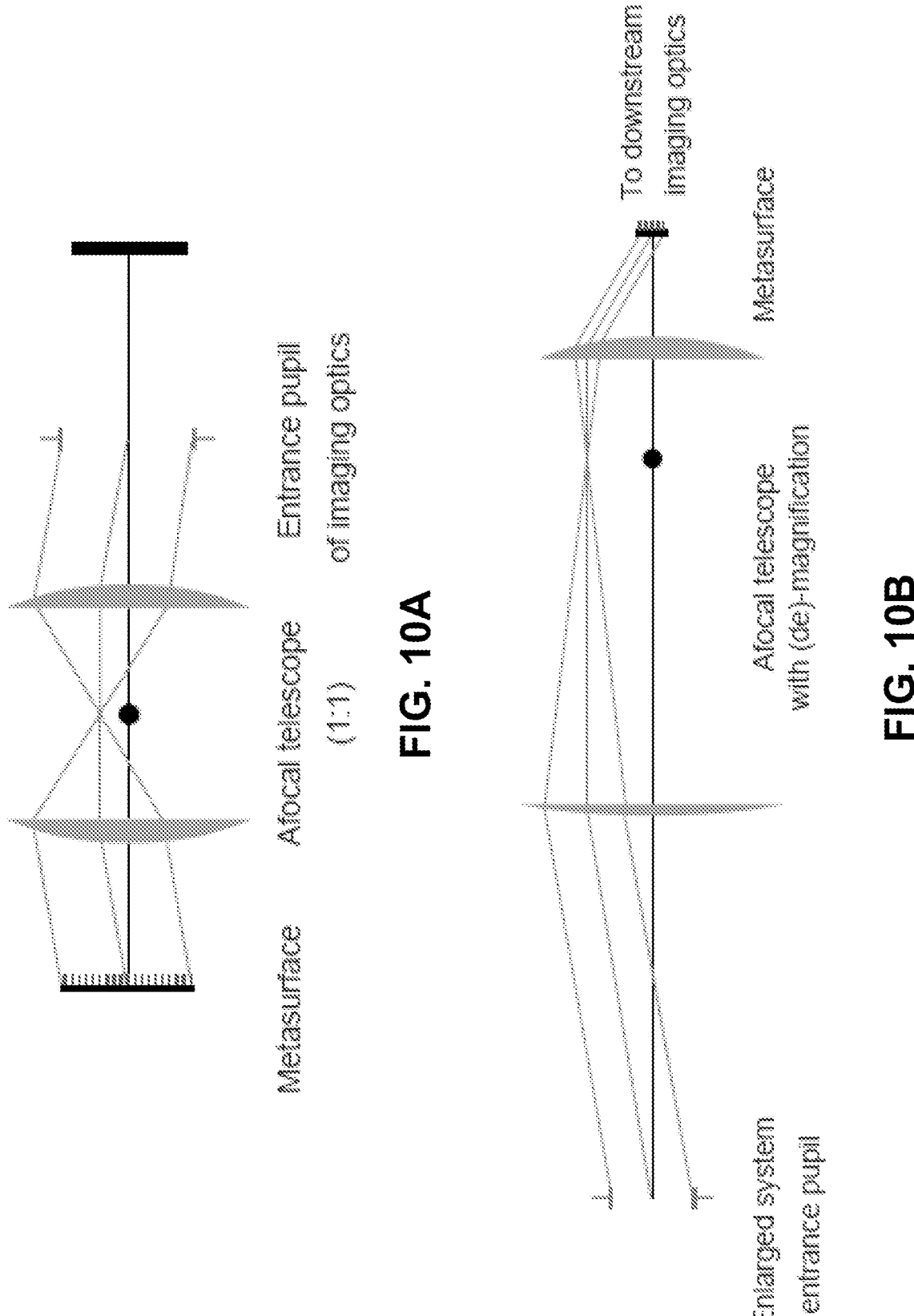
FIGS. 10A-10B illustrates various considerations associated with sizing of an entrance pupil, according to various example embodiments.

Referring to FIGS. 10A-10B, several schematic diagrams illustrating sizing of an entrance pupil are shown, according to various embodiments. In various embodiments, positioning the metasurface attachment outside of the imaging optics' entrance pupil may result in vignetting (e.g., unequal radiance over the FOV). Vignetting may be undesirable because it can require longer exposure times or decreases the system's shot noise-limited signal-to-noise ratio. FIG. 10A illustrates a metasurface that is sized to match a lens' entrance pupil, thereby eliminating vignetting. An afocal, 1:1 telescope can make the metasurface conjugate to the lens' entrance pupil. FIG. 10B illustrates a metasurface that is magnified from the perspective of object space by an afocal telescope, effectively increasing DEP. The size of the metasurface can be magnified from the perspective of object space by an afocal telescope, effectively increasing $D_{EP}$. To conserve Étendue, the metasurface can receive a wider range of incident angles. The metasurface can implement a larger grating angle and be paired with a lens or sensor with a larger $\theta$ camera than would otherwise be required by the FOV imaged.

Figure 11:
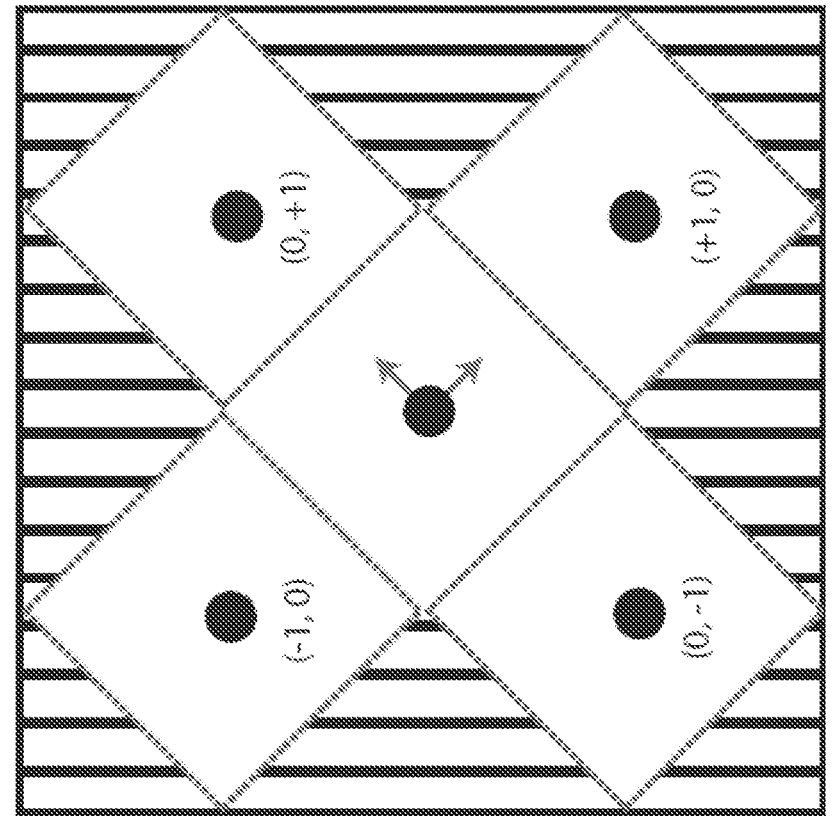
FIG. 11 illustrates an example allocation of diffraction orders on a sensor surface, according to an example embodiment.

Referring now to FIG. 11, sensor allocation of a number of images projected on a sensor is shown, according to an example embodiment. In various embodiments, a diffraction grating having a square periodicity with two lattice vectors of equal magnitude that are strictly perpendicular may result in a diffraction pattern as shown (e.g., if the grating is turned 45° so that its lattice vectors point toward the corners of a square). In some embodiments, 57% of a square sensor's space go unused to prevent image overlap. However, it should be understood that a diffraction pattern may be optimized to other sensor shapes as well. For example, a metasurface grating whose lattice vectors are not perpendicular and not equal in magnitude may be designed to produce a diffraction pattern having rectangular symmetry, thereby optimizing the use of a rectangular sensor.

Figure 12A:
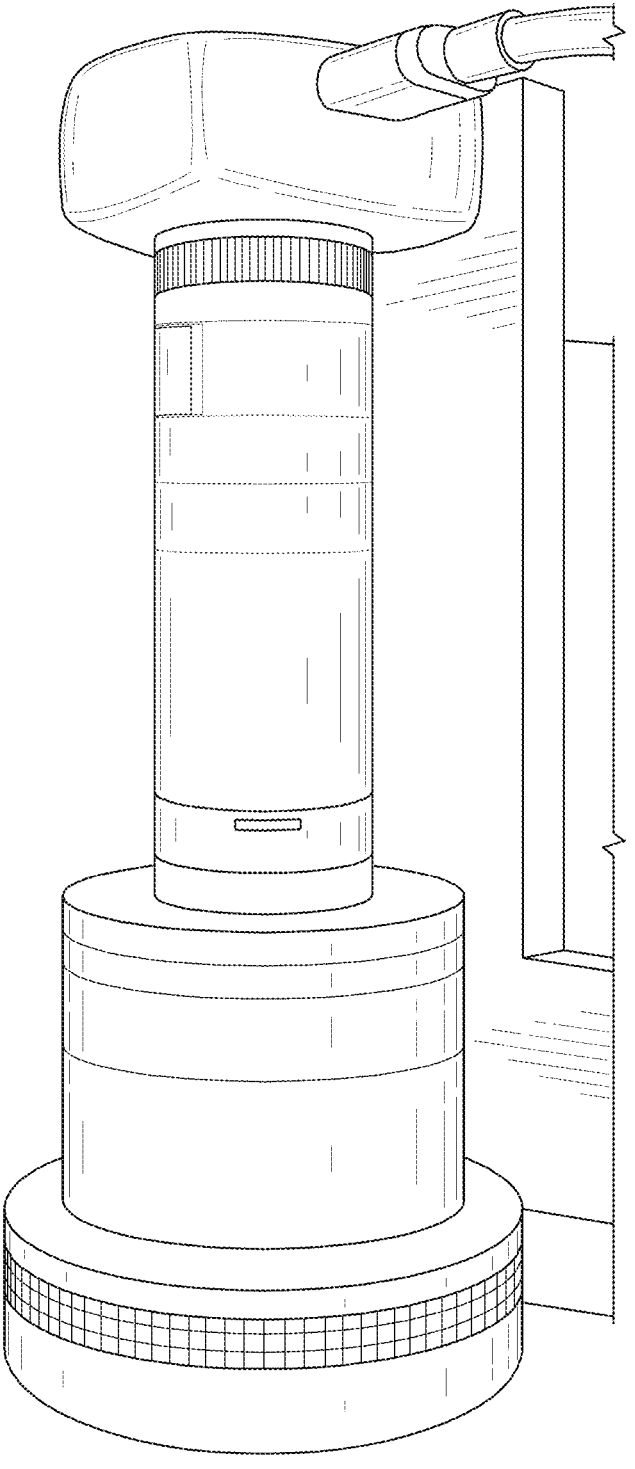
FIGS. 12A-12D illustrate a method of extending an angular field of view, according to an example embodiment.
Figure 12B:
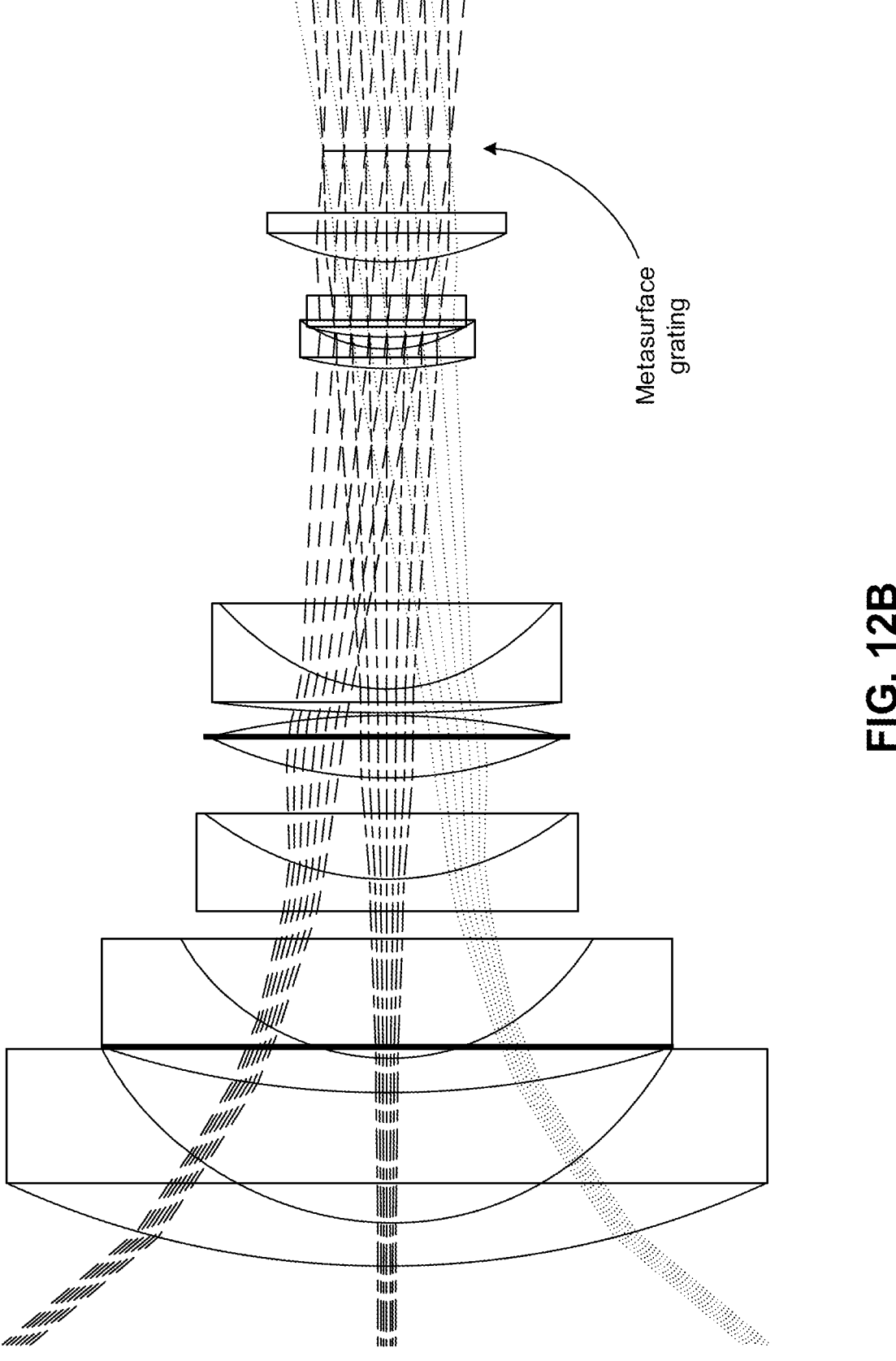
Figure 12C:
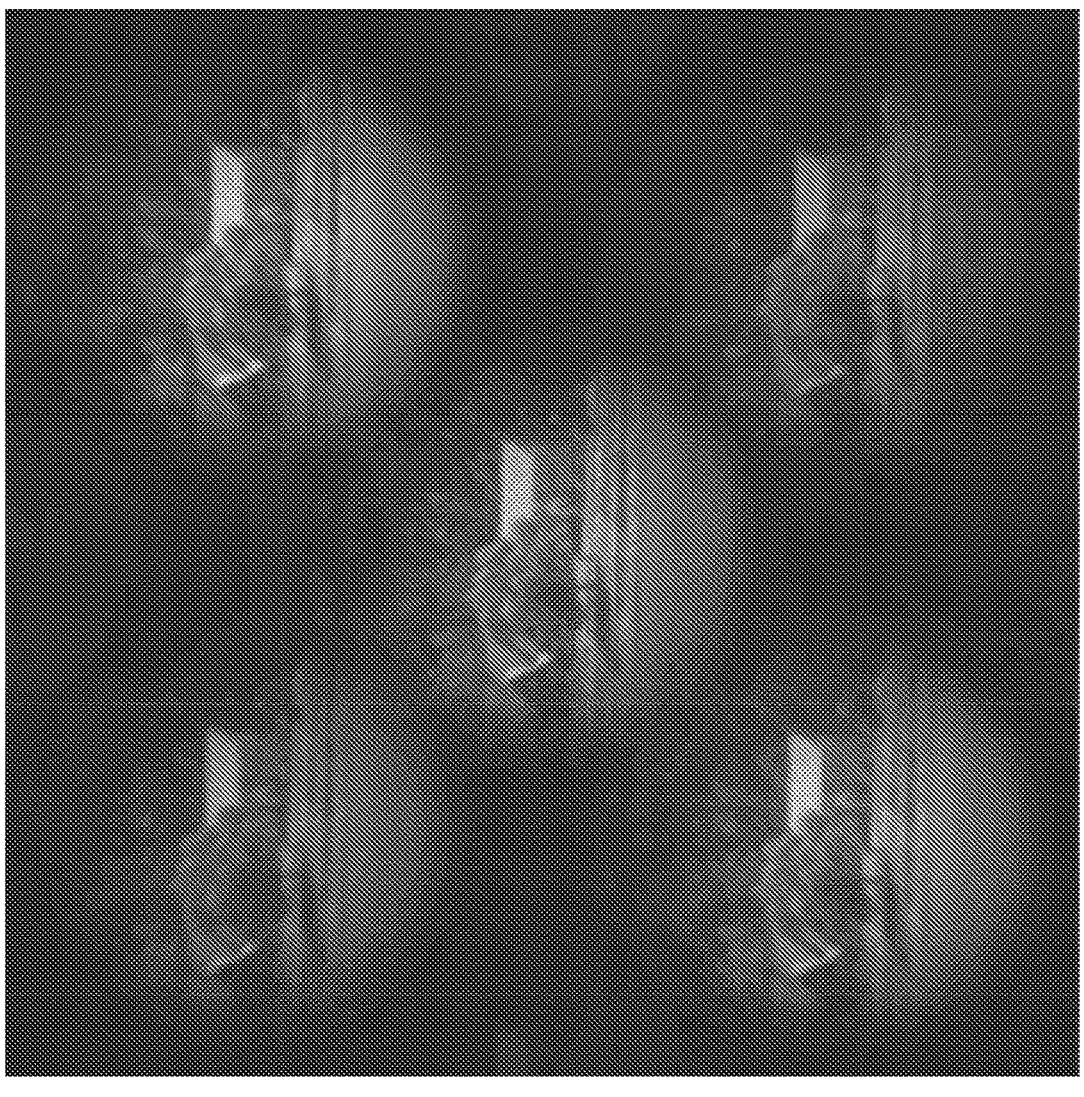
Figure 12D:
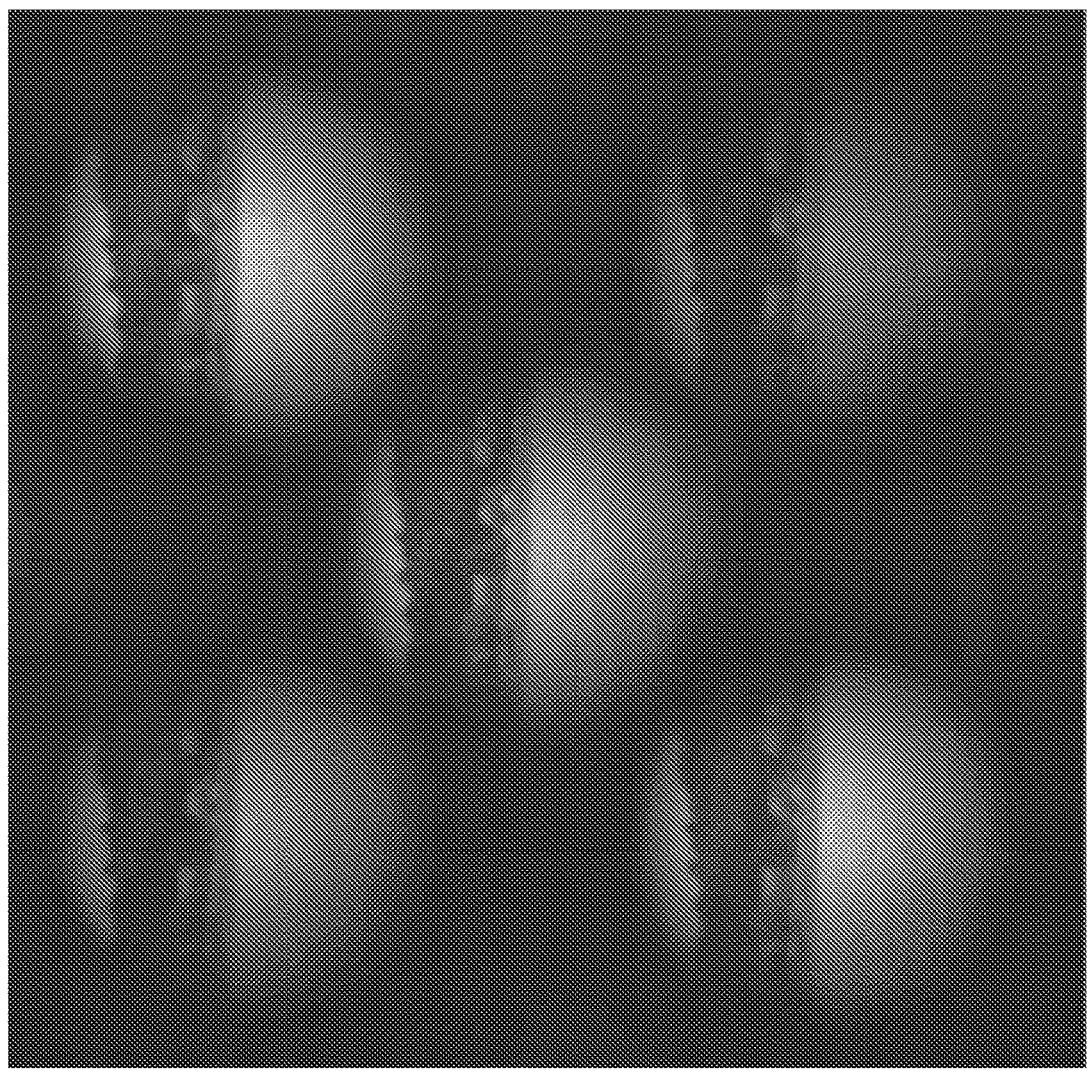

Referring now generally to FIGS. 12A-12D, field of view design considerations are discussed, according to an example embodiment. Polarimetry over a wide FOV may include a large grating angle (e.g., because $\theta_{FOV}=\theta_{grating}$). In various embodiments, as $\theta_{FOV}$ grows larger the grating period D shrinks. Therefore, large FOVs may correspond to small grating periods. For example, imaging over a 50° FOV (which may thus include a 50° grating angle) may involve D=0.69 µm. Such a grating period may be undesirable (e.g., because it may result in a small array of nanostructures, etc.). For example, these dimensions may be outside a paraxial regime of validity, thereby degrading function and efficiency at higher angles. In some embodiments, FOV limitations may be overcome using additional optical elements. For example, an afocal system may be used to de-magnify a wide FOV into a small FOV at the plane of the grating such as a telescope including two converging lenses whose size can be reduced by the inclusion of both diverging and converging lenses (e.g., a fisheye lens, etc.). FIG. 12A illustrates a metasurface adapted camera including a fisheye lens to expand a FOV (e.g., by a factor of 4 from 6° to 24°). FIG. 12B illustrates a schematic of the metasurface adapted camera including the fisheye lens to expand the FOV. FIG. 12C illustrates an image without this fisheye lens. FIG. 12D illustrates an image with the fisheye lens showing the expanded FOV.

Figure 13A:
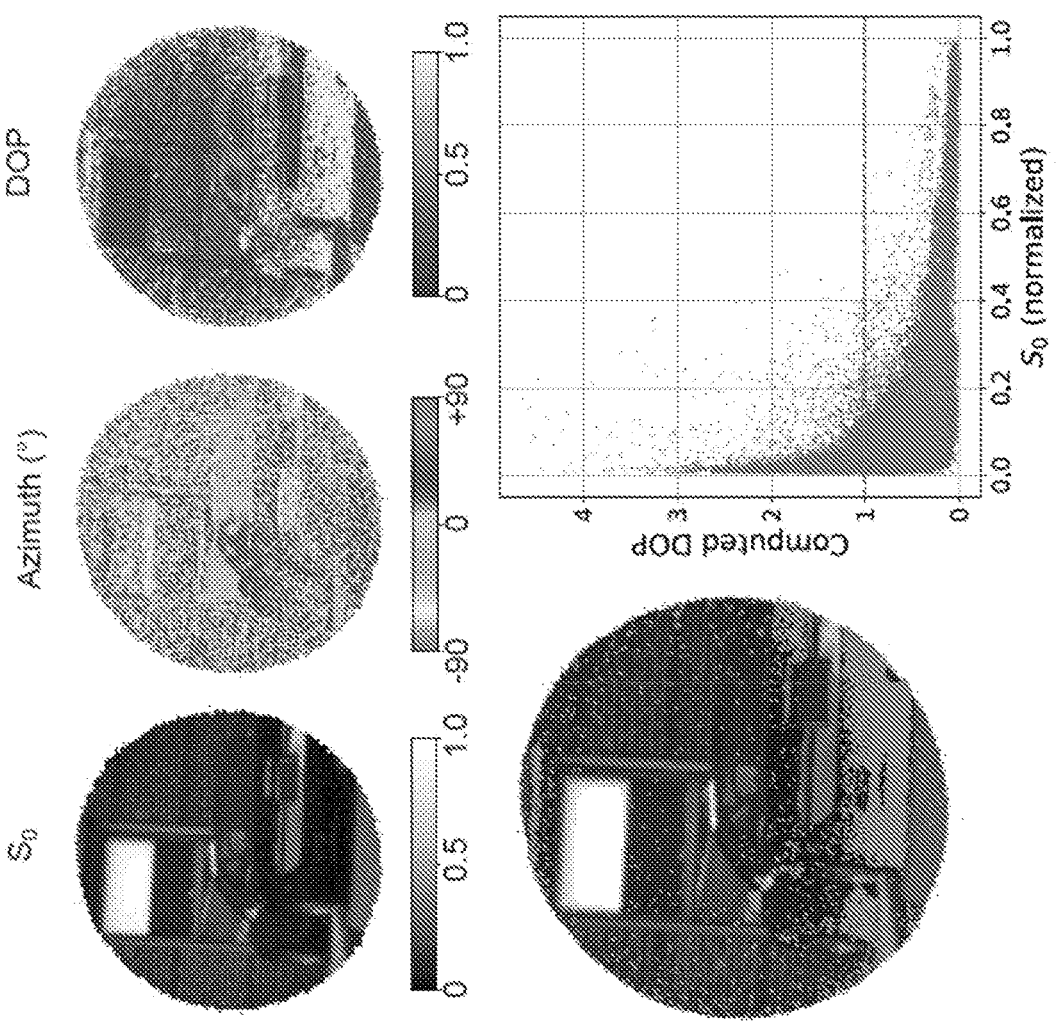

Referring now generally to FIGS. 13A and 13B, noise and degree of polarization (DOP) design considerations are discussed, according to an example embodiment. FIG. 13A illustrates the intensity, azimuth, and DOP associated with an example scene of a sports car. As shown, the image exhibits unphysical values of the DOP (as shown by the lighter colored dots) that congregate in dark regions of the image (e.g., the car's underside shadow, etc.). FIG. 13A also includes a plot comparing $S_0$, the intensity, to the computed DOP at each pixel which reveals a correlational trend between low intensity and high, and unphysical, DOP.

In some embodiments, a perfect sensor with no noise (e.g., thermal, electronic, and/or photonic noise, etc.) would faithfully report the incident intensity and the DOP would remain physical. However, at low intensity, noise (e.g., from the sensor's amplifiers and ADCs, etc.) may overwhelm the signal. In some embodiments, this noise may be reduced by averaging (e.g., effectively sampling the noise's statistical distribution) as shown in FIG. 13B. In various embodiments, averaging may include pre-processing the raw sensor data using a Gaussian blur kernel (e.g., the size of which is shown by the 3, 5, and 7 in FIG. 13B). As shown, pixels with unphysical DOP may be mitigated using blurring (e.g., as shown by the reduction in lighter colored dots representing unphysical DOP values).

Figure 14A:
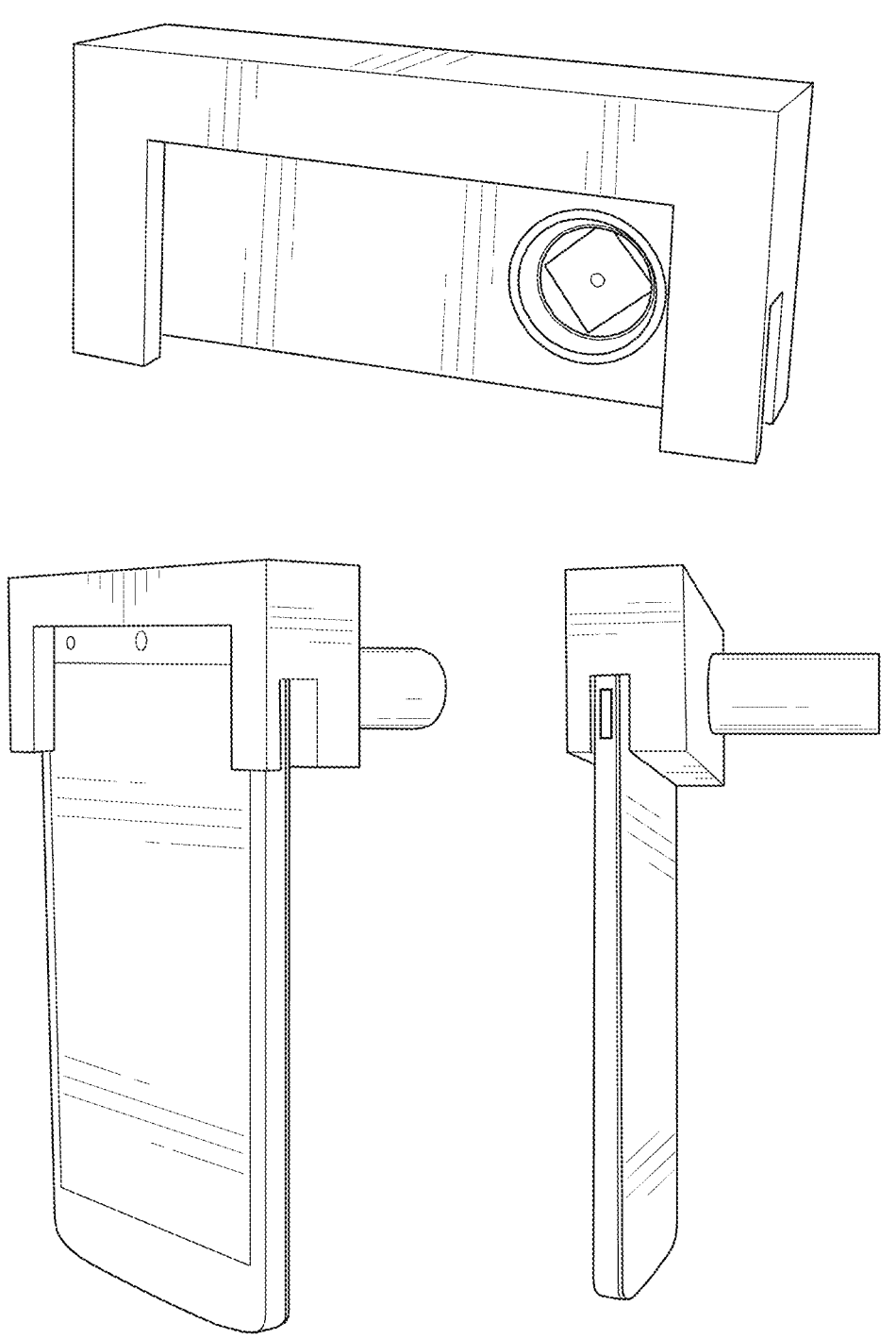
FIGS. 14A and 14B illustrate an implementation of a metasurface attachment coupled to an intensity-only imaging device, according to an example embodiment.
Figure 14B:
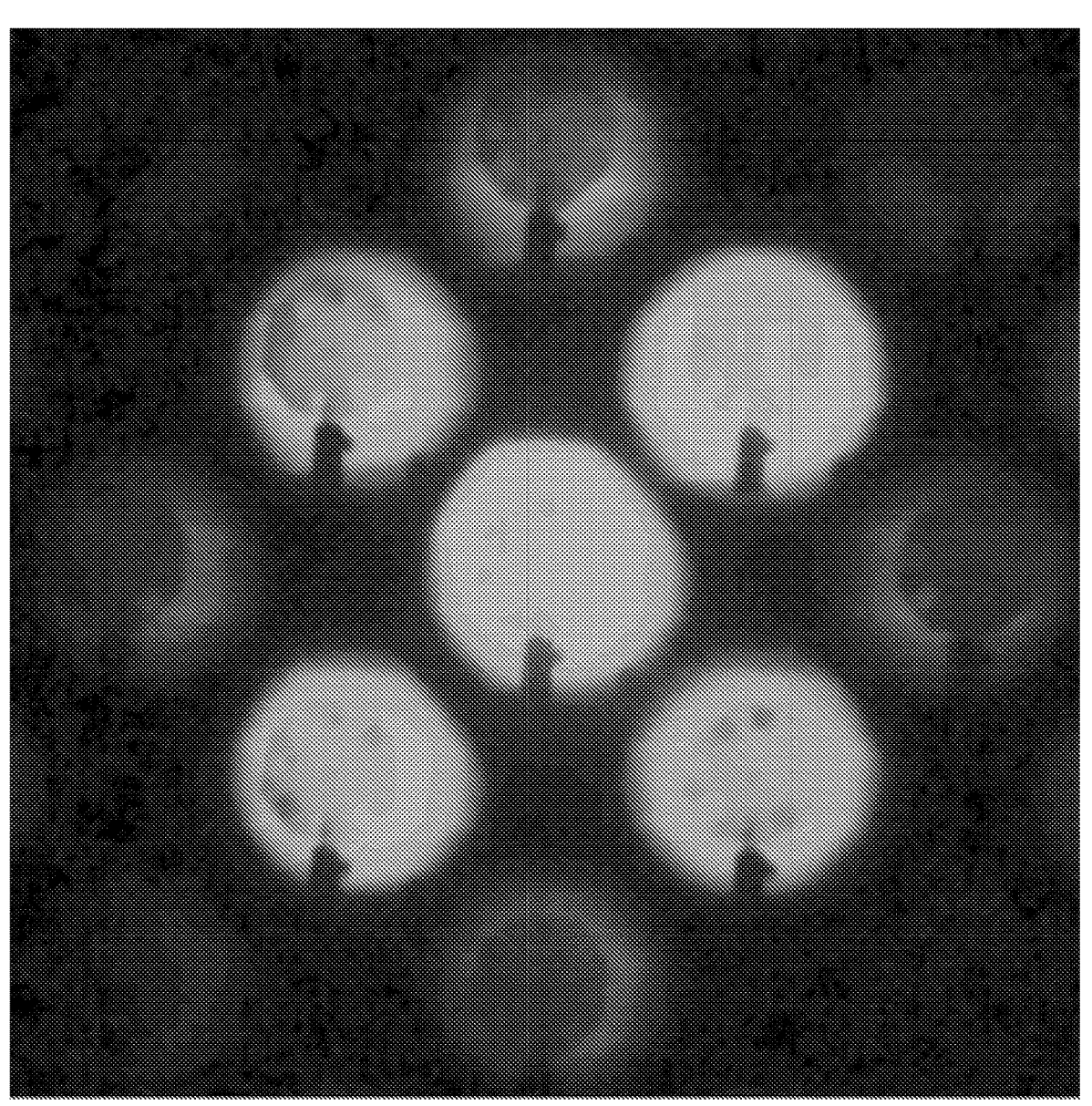

Referring now to FIGS. 14A and 14B, an example implementation of a metasurface attachment of the present disclosure applied to a smartphone camera is shown, according to an example embodiment. As shown in FIG. 14A, a metasurface grating is positioned in a mount against the front lens of a mobile phone camera objective. In various embodiments, a color filter and an aperture acting as a pseudo-field stop are also mounted in the mount. The mount may be 3D printed. FIG. 14B illustrates an image taken on the smartphone of a wheel of polarizers. As shown, polarimetric contrast can be observed.

As used herein, the term "active element" is used to describe a mechanically and/or electrically active optical element such as an adjustable lens. For example, an active element may include an electromechanical lens that adjusts a spacing of lens elements to change a depth of field between image captures. As another example, an active element may include a mechanical mechanism that moves such as a variable aperture in a camera lens or an electrical element such as an LCD screen that displays different values. It should be understood that "simultaneously producing a plurality of non-overlapping images of a scene" as used herein refers to modifying incident light to produce a plurality of images without adjusting an image capture device or a component thereof (e.g., a lens, etc.) between images. For example, a single lens may be used to receive incident light and "split" the incident light into four images that are projected onto a single image sensor without adjusting an optics of the single lens (e.g., taking a first image, adjusting a lens, and taking a second image, etc.). As used herein, the term "intensity-only sensor" refers to an image sensor capable of capturing image data but not capable of capturing polarimetry information without significantly more. For example, an intensity-only image sensor as used in a smartphone camera may be modified according to the systems and methods disclosed herein to enable the intensity-only image sensor to capture polarimetry information where it could not before being modified. In various embodiments, an entrance pupil refers to an optical image of a physical aperture stop. For example, an entrance pupil may be an aperture in a lens through which light travels.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal to each other if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An imaging device, comprising:
a polarization-sensitive diffraction grating configured to receive incident light from a scene, and modify the incident light to simultaneously produce a plurality of non- overlapping images of the scene, each of a different diffraction order, on an intensity-only sensor;
a first adjustment mechanism configured to control at least one of: vignetting of the plurality of non-overlapping images on the intensity-only sensor, or an object distance of the imaging device;
the intensity-only sensor configured to measure an intensity associated with each of the plurality of non-overlapping images; and a processing circuit comprising a processor and memory, the memory having instructions stored thereon that, when executed by the processor, cause the processing circuit to:

receive the measured intensities associated with each of the plurality of non-overlapping images; and analyze the received measured intensities to produce polarization information including a full-Stokes vector corresponding to the incident light.

2. The imaging device of claim 1, wherein the polarization-sensitive diffraction grating comprises a metasurface including a plurality of optical elements each with a dimension that is less than a wavelength of the incident light.

3. The imaging device of claim 2, wherein the metasurface redirects the incident light to produce the plurality of non-overlapping images each of the different diffraction order.

4. The imaging device of claim 2, further comprising a second adjustment mechanism configured to control at least one of: a deflection angle of the polarization-sensitive diffraction grating, a focal length of the imaging device, or a field of view (FOV) of the imaging device for polarization imaging.

5. The imaging device of claim 4, wherein the second adjustment mechanism is configured to electronically deform a substrate of the metasurface to control the focal length of the imaging device, or configured to control the FOV according to the focal length of the imaging device and the deflection angle of the polarization-sensitive diffraction grating.

6. The imaging device of claim 4, wherein the second adjustment mechanism changes a periodic repetition length of the polarization-sensitive diffraction grating.

7. The imaging device of claim 1, wherein the polarization information corresponds to a set of polarization states corresponding to vertices of a tetrahedron inscribed in a Poincaré sphere.

* * * * *